United States Patent
Yoshizaki et al.

(10) Patent No.: US 10,094,307 B2
(45) Date of Patent: Oct. 9, 2018

(54) CONTROLLING DEVICE FOR INTERNAL COMBUSTION ENGINE EQUIPPED WITH TURBOCHARGER

(71) Applicant: Toyota Jidosha Kabushiki Kaisha, Aichi (JP)

(72) Inventors: Satoshi Yoshizaki, Gotenba (JP); Satoru Tanaka, Odawara (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 310 days.

(21) Appl. No.: 14/895,660

(22) PCT Filed: Jun. 6, 2013

(86) PCT No.: PCT/JP2013/065740
§ 371 (c)(1),
(2) Date: Dec. 3, 2015

(87) PCT Pub. No.: WO2014/196070
PCT Pub. Date: Dec. 11, 2014

(65) Prior Publication Data
US 2016/0123252 A1    May 5, 2016

(51) Int. Cl.
*F02D 37/02* (2006.01)
*F02D 23/00* (2006.01)
*F02D 41/10* (2006.01)
*F02D 41/14* (2006.01)
(Continued)

(52) U.S. Cl.
CPC ............ *F02D 37/02* (2013.01); *F02D 23/00* (2013.01); *F02D 41/0005* (2013.01);
(Continued)

(58) Field of Classification Search
CPC ............ F02D 13/0234; F02D 2250/21; F02D 2250/26; F02D 23/00; F02D 37/02;
(Continued)

(56) References Cited

U.S. PATENT DOCUMENTS 6,089,206 A * 7/2000 Suzuki ................ F02D 41/307
123/295
6,754,578 B1 * 6/2004 Bidner .................. F02D 17/02
701/108
(Continued)

FOREIGN PATENT DOCUMENTS

DE    102007000088 A1    8/2007
JP    2001-227399 A    8/2001
JP    2002-155788 A    5/2002

*Primary Examiner* — David Hamaoui
*Assistant Examiner* — Carl Staubach
(74) *Attorney, Agent, or Firm* — Hauptman Ham, LLP

(57) ABSTRACT

A target first air amount for achieving a requested torque by an operation of an intake property variable actuator is calculated by using a first parameter. A target second air amount for achieving the requested torque by an operation of a turbocharging property variable actuator is calculated by using a second parameter. A value of a first parameter changes to a value that reduces a conversion efficiency of an air amount into torque in response to the requested torque decreasing to a first reference value or lower. Further, a value of the second parameter starts to change to a direction to reduce the conversion efficiency in response to the requested torque decreasing to a second reference value that is larger than the first reference value, or lower, and gradually changes to a direction to reduce the conversion efficiency in accordance with the requested torque further decreasing from the second reference value to the first reference value. The target air-fuel ratio is set at a first air-fuel ratio in a period in which the requested torque is larger than the first reference value, and is switched to a second air-fuel ratio which is leaner than the first air-fuel ratio in response to a decrease of the requested torque to the first reference value or lower.

8 Claims, 7 Drawing Sheets

(51) Int. Cl.
  *F02D 41/30* (2006.01)
  *F02P 5/15* (2006.01)
  *F02D 41/00* (2006.01)
  *F02P 9/00* (2006.01)
  *F02D 13/02* (2006.01)

(52) U.S. Cl.
  CPC ....... *F02D 41/0007* (2013.01); *F02D 41/107* (2013.01); *F02D 41/1475* (2013.01); *F02D 41/3005* (2013.01); *F02D 41/307* (2013.01); *F02D 41/3029* (2013.01); *F02P 5/1504* (2013.01); *F02P 9/002* (2013.01); *F02D 13/0234* (2013.01); *F02D 2250/21* (2013.01); *F02D 2250/26* (2013.01); *Y02T 10/144* (2013.01); *Y02T 10/46* (2013.01)

(58) Field of Classification Search
  CPC ............. F02D 41/0005; F02D 41/0007; F02D 41/107; F02D 41/1475; F02D 41/3005; F02D 41/3029; F02D 41/307; F02P 5/1504; F02P 9/002
  See application file for complete search history.

(56) References Cited

U.S. PATENT DOCUMENTS

| | | | |
|---|---|---|---|
| 7,512,479 B1* | 3/2009 | Wang ................. | F02D 41/0002 123/568.21 |
| 2001/0013329 A1* | 8/2001 | Matsumoto ............. | F02D 37/02 123/295 |
| 2016/0090929 A1* | 3/2016 | Tanaka .................... | F02D 41/12 123/406.52 |
| 2016/0090935 A1* | 3/2016 | Tanaka .................. | F02D 41/307 701/104 |
| 2016/0123246 A1* | 5/2016 | Saito ......................... | F02P 5/15 123/444 |
| 2016/0123250 A1* | 5/2016 | Matsumoto ......... | F02D 41/3023 123/406.46 |
| 2016/0123253 A1* | 5/2016 | Saito .................... | F02D 41/307 123/406.23 |
| 2016/0153373 A1* | 6/2016 | Yoshizaki ............... | F02D 41/10 123/406.48 |
| 2016/0369712 A1* | 12/2016 | Matsumoto ............ | F02M 26/45 |

* cited by examiner

CONTROLLING DEVICE FOR INTERNAL COMBUSTION ENGINE EQUIPPED WITH TURBOCHARGER

CROSS-REFERENCE TO RELATED APPLICATION

This is a national phase application based on the PCT International Patent Application No. PCT/JP2013/065740 filed Jun. 6, 2013, the entire contents of which are incorporated herein by reference.

TECHNICAL FIELD

The present invention relates to a controlling device that performs integrated control of an air amount, a fuel supply amount, and an ignition timing of an internal combustion engine equipped with a turbocharger that is configured to be capable of switching an air-fuel ratio that is used for operation between at least two air-fuel ratios.

BACKGROUND ART

Japanese Patent Laid-Open No. 2001-227399 discloses technology (hereunder, referred to as a "related art") relating to switch control of a combustion mode in an internal combustion engine capable of switching the combustion mode of the internal combustion engine from a stratified charge combustion mode to a homogeneous combustion mode, or from the homogeneous combustion mode to the stratified charge combustion mode. Before and after switch of the combustion mode, control parameters such as a degree of throttle opening and an EGR amount are adjusted to keep a stable combustion state, and when these control parameters change, a torque fluctuation occurs. According to the above described related art, when the control parameters to be the cause of a torque fluctuation are adjusted before and after switch of the combustion mode, the torque fluctuation amount by the adjustment amounts is converted into the change amounts of control parameters that do not relate to the adjustment, and the control parameters are changed by the change amounts.

Incidentally, there has been conventionally known an internal combustion engine capable of performing switching control of an air-fuel ratio such as switching from the operation by a theoretical air-fuel ratio to the operation by an air-fuel ratio leaner than the theoretical air-fuel ratio, or switching in the opposite way. The above described related art discloses the above described art also being able to be applied at the time of switch of a lean operation and a stoichiometric/rich operation in a lean burn engine like this.

However, when the above described related art is applied to a lean burn engine equipped with a turbocharger, a torque fluctuation at the time of switch of an air fuel ratio cannot be always restrained. That is to say, when the air-fuel ratio is switched from a theoretical air-fuel ratio to an air-fuel ratio that is leaner than the theoretical air-fuel ratio at the time of deceleration of the engine equipped with a turbocharger, for example, the air fuel ratio to be a target is switched from an amount corresponding to the theoretical air-fuel ratio to an amount corresponding to a lean air-fuel ratio. However, even when the air amount to be the target is switched, an actual air amount does not immediately track the air amount to be the target. This is because a response delay due to a turbo lag occurs in the engine equipped with a turbocharger, in addition to a response delay of a throttle and the like which are actuators that regulate the air amount. Since in a time period in which the actual air amount is smaller than the target air amount, the actual torque is larger than a requested torque, the requested torque is realized by retardation control of the ignition timing, and the torque level difference is eliminated. However, when the time period until the target air amount is realized becomes long due to the influence of the above described turbo lag, the retardation control of the ignition timing is restricted by a constraint such as an upper limit of the temperature of the exhaust system, as a result of which, a torque level difference is caused.

CITATION LIST

Patent Literature

Patent Literature 1: Japanese Patent Laid-Open No. 2001-227399

SUMMARY OF INVENTION

The present invention has been conceived in view of the above described problems, and a problem of the present invention is, in an internal combustion engine equipped with a turbocharger that is configured to be capable of switching an air-fuel ratio that is used for operation between at least two air-fuel ratios, to switch the air-fuel ratio with a high responsiveness while torque is changed smoothly in accordance with the request of the driver.

The present invention can be applied to the configuration of a controlling device for an internal combustion engine. Hereunder, a general outline of a controlling device for an internal combustion engine according to the present invention will be described. However, as will be apparent from the contents of the present invention described below, the present invention can be applied to the procedures of a control method for an internal combustion engine and can also be applied to an algorithm of a program that is executed with a controlling device.

A controlling device according to the present invention adopts, as a control object, an internal combustion engine equipped with a turbocharger that has three kinds of actuators, and is configured to be capable of selecting an operation by a first air-fuel ratio and an operation by a second air-fuel ratio that is leaner than the first air-fuel ratio. The three kinds of actuators refer to a first actuator that changes an air amount, a second actuator that supplies fuel into a cylinder, and a third actuator that ignites a mixture gas in the cylinder. The first actuator includes intake property variable actuators that change an intake property of air that is taken into a cylinder in an intake passage at a downstream side of the turbocharger, and turbocharging property variable actuators that change a turbocharging property of the turbocharger. More specifically, the intake property variable actuators include a throttle, and a variable valve timing mechanism that changes a valve timing of an intake valve, and the turbocharging property variable actuators include a variable nozzle or a wastegate valve. The second actuator is more specifically an injector that injects fuel, and includes a port injector that injects fuel into an intake port, and a cylinder injector that directly injects fuel into the cylinder. The third actuator is more specifically an ignition device. The controlling device according to the present invention performs integrated control of an air amount, a fuel supply amount, and an ignition timing of the internal combustion engine by means of coordinated operations of these three kinds of actuators.

The controlling device according to the present invention can be embodied by a computer. More specifically, the controlling device according to the present invention can be constituted by a computer that is equipped with a memory in which a program that describes processing for realizing various functions is stored, and a processor that reads the program from the memory and executes the program. Functions that the controlling device according to the present invention is equipped with include, as functions for determining a target air amount, and a target air-fuel ratio to be used in coordinated operations of the three kinds of actuators described above, a requested torque reception function, a target air-fuel ratio switching function, a target air amount calculation function, and a parameter value changing function.

According to the requested torque reception function, a requested torque with respect to the internal combustion engine is received. The requested torque is calculated based on a signal that is responsive to the degree of opening of an accelerator pedal that is operated by the driver. In a case where the driver issues a deceleration request with respect to the internal combustion engine, a requested torque is obtained that decreases in accordance with the speed at which the driver releases the accelerator pedal. In a case where the driver issues an acceleration request with respect to the internal combustion engine, a requested torque is obtained that increases in accordance with the speed at which the driver depresses the accelerator pedal.

According to the target air amount calculation function, a target air amount for achieving the requested torque is calculated backwards from the requested torque. In calculation of the target air amount, a parameter that provides a conversion efficiency of the air amount to torque is used. More specifically, a first parameter is used in calculation of a target first air amount, and a second parameter is used in calculation of a target second air amount. Values of these parameters are variable, and are changed by a parameter value changing function. According to the parameter value changing function, the value of the first parameter is changed to a value that reduces a conversion efficiency in response to the requested torque being decreased to a first reference value or lower. Further, according to the parameter value changing function, a value of the second parameter is started to be changed to a direction to reduce the conversion efficiency in response to the requested torque being decreased to a second reference value that is larger than the first reference value, or lower. Subsequently, the value of the second parameter is gradually changed to the direction to reduce the conversion efficiency in accordance with the requested torque further decreasing from the second reference value to the first reference value. If the value of the requested torque is the same, the target air amount becomes smaller as the conversion efficiency indicated by the value of the parameter is higher, and as the conversion efficiency indicated by the value of the parameter is lower, the target air amount becomes larger. The first reference value and the second reference value to the torque may be fixed values, but are preferably changed properly in accordance with the engine speed of the internal combustion engine and the other conditions.

When a requested first torque and a requested second torque that is obtained by eliminating a pulse component in a torque reduction direction from the requested first torque are received by the requested torque reception function, the target air amount calculation function preferably calculates the target first air amount by using the requested first torque, and calculates the target second air amount by using the requested second torque.

According to a target air-fuel ratio switching function, in a transitional period in which the requested torque is decreasing, after the value of the first parameter is changed to the value that reduces the conversion efficiency in response to the requested torque being decreased to the first reference value or lower, the target air-fuel ratio is switched from the first air-fuel ratio to the second air-fuel ratio which is leaner than the first air-fuel ratio. A specific timing for switching the target air-fuel ratio from the first air-fuel ratio to the second air-fuel ratio is preferably a time point at which a difference between the target first air amount and an estimated air amount becomes a threshold value or smaller. Further, the target air-fuel ratio may be switched from the first air-fuel ratio to the second air-fuel ratio at a time point at which a fixed time period elapses after the value of the first parameter is changed.

As an example of the parameters for use in calculation of the target first air amount and the target second air amount, parameters corresponding to the air-fuel ratio can be cited. Since the torque which occurs with the same air amount becomes lower as the air-fuel ratio is leaner than the theoretical air-fuel ratio, the parameter corresponding to the air-fuel ratio corresponds to a parameter that gives a conversion efficiency of the air amount into torque. When the parameter corresponding to the air-fuel ratio is used in calculation of the target first air amount, the value of the first parameter is switched from the value corresponding to the first air-fuel ratio to the value corresponding to the second air-fuel ratio in response to decrease of the requested torque to the first reference value or lower. That is to say, when the requested torque decreases to the first reference value or lower, the air-fuel ratio for use in calculation of the target first air amount is switched from the first air-fuel ratio to the second air-fuel ratio prior to the target air-fuel ratio being switched from the first air-fuel ratio to the second air-fuel ratio. Further, when the parameter corresponding to the air-fuel ratio is used in calculation of the target second air amount, the value of the second parameter is gradually changed from the value corresponding to the first air-fuel ratio to the value corresponding to the second air-fuel ratio in response to the decrease of the requested torque to the second reference value or lower. That is to say, when the requested torque is decreased to the second reference value or lower, the air-fuel ratio which is used in calculation of the target second air amount is gradually switched from the first air-fuel ratio to the second air-fuel ratio, prior to the first parameter being switched from the first air-fuel ratio to the second air-fuel ratio.

The controlling device according to the present invention subjects the three kinds of actuator to coordinated operations based on the target first air amount, the target second air amount, and the target air-fuel ratio determined by the above described processing. Functions that the controlling device of the present invention is equipped with include a first actuator control function, a second actuator control function, and a third actuator control function as functions for performing coordinated operations based on the target air amount and the target air-fuel ratio.

According to the first actuator control function, an operation amount of the intake property variable actuator is determined based on the target first air amount, and an operation amount of the turbocharging property variable actuator is determined based on the target second air amount. Subsequently, operations of the intake property variable actuator and the turbocharging property variable actuator are performed in accordance with the determined operation amounts. The actual air amount changes so as to track the target air amount according to the operations of these actuators. According to the controlling device according to the present invention, a decrease in the target second air amount in a period until the requested torque decreases and the operation mode is switched is restrained, and a decrease in the turbo charging pressure immediately before switch of the operation mode is restrained. Hence, the actual air amount immediately after switching of the target air-fuel ratio tracks the target air amount in a short time period.

According to the second actuator control function, a fuel supply amount is determined based on the target air-fuel ratio. Operation of the second actuator is then performed in accordance with the fuel supply amount that is determined.

According to the third actuator control function, an ignition timing for achieving the requested torque is determined based on a torque that is estimated based on the operation amount of the first actuator and the target air-fuel ratio, and the requested torque. Operation of the third actuator is then performed in accordance with the determined ignition timing. The actual air amount can be estimated based on the operation amount of the first actuator, and the torque can be estimated based on the estimated air amount and the target air-fuel ratio. Operation of the third actuator is performed by correcting an excessive amount of the estimated torque with respect to the requested torque by means of the ignition timing. According to the controlling device according to the present invention, the actual air amount immediately after switching of the target air-fuel ratio tracks the target air amount at a high speed, and therefore, the time period in which the excessive amount of the estimated torque with respect to the requested torque is corrected according to the ignition timing can be made short.

The aforementioned functions which the controlling device according to the present invention includes are functions that are preferable to switch the air-fuel ratio with high responsiveness while smoothly changing torque at a time of deceleration. In order to switch the air-fuel ratio with high responsiveness while smoothly changing torque at a time of acceleration, it is preferable to further include the following functions.

According to a preferable mode, the target air-fuel ratio switching function and the parameter value changing function respectively include additional functions. According to the additional function included in the parameter value changing function, in a transitional time period in which the requested torque increases, the value of the first parameter is changed to a value that increases the conversion efficiency in response to an increase of the requested torque to the third reference value or higher. Further, according to the additional function included in the target air-fuel switching function, in response to the value of the first parameter being changed to a value that increases the conversion efficiency in response to the requested torque being increased to the third reference value or higher, the target air-fuel ratio is switched from the second air-fuel ratio to the first air-fuel ratio. That is to say, when the requested torque increases in accordance with the acceleration request by a driver, the target air-fuel ratio is maintained at the second air-fuel ratio in a period in which the requested torque is smaller than the third reference value, and when the requested torque is increased to the third reference value or higher, the target air-fuel ratio is switched to the first air-fuel ratio.

Further, according to the additional function included in the parameter value changing function, in the transitional period in which the requested torque is increasing, the value of the second parameter is started to be changed to the direction to increase the conversion efficiency in response to an increase of the requested torque to the third reference value or higher. Subsequently, in accordance with the requested torque further increasing from the third reference value, the value of the second parameter is gradually changed to the direction to increase the conversion efficiency.

In a preferable mode, as the parameter for use in calculation of the target air amount, a parameter corresponding to the air-fuel ratio can be used. When the parameter corresponding to the air-fuel ratio is used in calculation of the target air amount, the value of the first parameter is switched to the value corresponding to the first air-fuel ratio from the value corresponding to the second air-fuel ratio, in responses to an increase of the requested torque to the third reference value or higher. That is to say, when the requested torque is increased to the third reference value or higher, the air-fuel ratio for use in calculation in the target first air amount is also switched from the second air-fuel ratio to the first air-fuel ratio simultaneously or substantially simultaneously with the target air-fuel ratio being switched from the second air-fuel ratio to the first air-fuel ratio. Further, in response to the increase of the requested torque to the third reference value or higher, the value of the second parameter is started to be changed from the value corresponding to the second air-fuel ratio. Subsequently, in accordance with the requested torque further increasing from the third reference value, the value of the second parameter is gradually changed from the value corresponding to the second air-fuel ratio to the value corresponding to the first air-fuel ratio. That is to say, when the requested torque is increased to the third reference value or higher, the target air-fuel ratio is switched from the second air-fuel ratio to the first air-fuel ratio in a step manner, while the air-fuel ratio for use in calculation of the target second air amount is gradually changed from the second air-fuel ratio to the first air-fuel ratio.

Advantageous Effect of Invention

According to the controlling device according to the present invention, the functions described above are equipped, whereby in the transitional period in which the requested torque provided by the driver is decreasing or increasing, the air-fuel ratio is switched with a high responsiveness while torque is changed smoothly in accordance with the request of the driver.

DESCRIPTION OF EMBODIMENTS

Embodiment

Hereunder, an embodiment of the present invention is described with reference to the drawings.

An internal combustion engine (hereinafter, referred to as "engine") which is a control object in the present embodiment is a spark-ignition type, four-cycle reciprocating engine. Further, the engine is a so-called "turbocharging lean-burn engine" equipped with a turbocharger that is constructed so as to be capable of selecting between a stoichiometric mode (first operation mode) that performs operation according to a theoretical air-fuel ratio and a lean mode (second operation mode) that performs operation according to an air-fuel ratio that is leaner than the theoretical air-fuel ratio as operation modes of the engine.

An ECU (Electrical Control Unit) mounted in the vehicle controls operations of the engine by actuating various kinds of actuators that are provided in the engine. The actuators actuated by the ECU include a throttle and variable valve timing mechanism (hereunder, referred to as "VVT") and wastegate valve (hereunder, referred to as WGV) as a first actuator that changes an air amount, an injector as a second actuator that supplies fuel into a cylinder, and an ignition device as a third actuator that ignites an air-fuel mixture in a cylinder. The throttle is provided at a downstream side of the turbocharger in an intake passage, the VVT is provided with respect to an intake valve, and the injector is provided at an intake port. The throttle and the VVT are intake property variable actuator that changes an intake property of air that is taken into a cylinder in the intake passage at the downstream side of the turbocharger, and the WGV is a turbocharging property variable actuator that changes a turbocharging property of the turbocharger. The ECU actuates these actuators to control operation of the engine. Control of the engine by the ECU includes switching of the operation mode from a stoichiometric mode to a lean mode, or from the lean mode to the stoichiometric mode.

Figure 1:
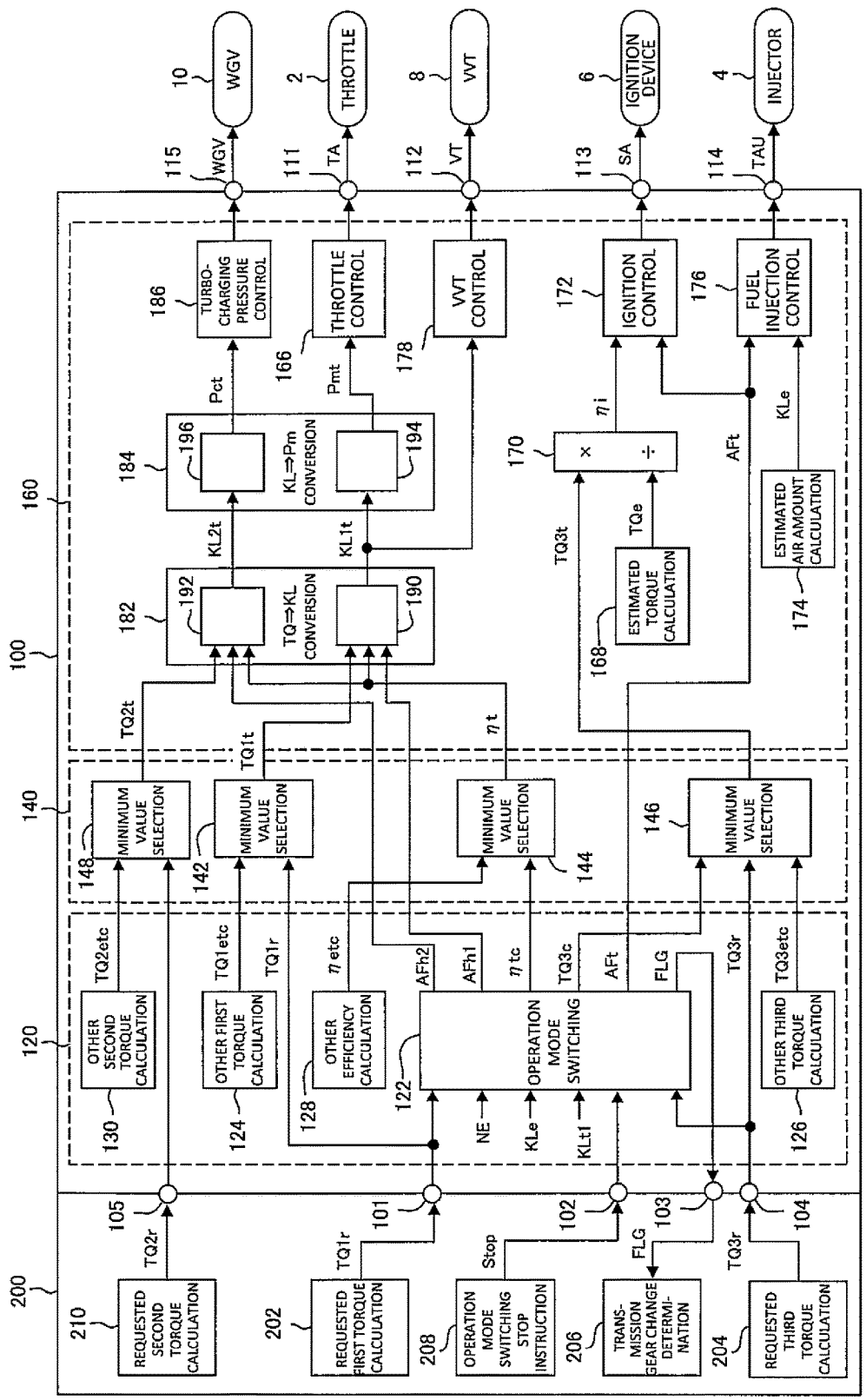
FIG. 1 is a block diagram illustrating a logic of a controlling device according to an embodiment of the present invention.

In FIG. 1, the logic of the ECU according to the present embodiment is illustrated in a block diagram. The ECU includes an engine controller 100 and a powertrain manager 200. The engine controller 100 is a controlling device that directly controls the engine, and corresponds to the controlling device according to the present invention. The powertrain manager 200 is a controlling device that performs integrated control of the entire driving system that includes the engine, an electronically controlled automatic transmission, and also vehicle controlling devices such as a VSC and TRC. The engine controller 100 is configured to control operation of the engine based on signals received from the powertrain manager 200. The engine controller 100 and powertrain manager 200 are each realized by software. More specifically, the respective functions of the engine controller 100 and the powertrain manager 200 are realized in the ECU by reading programs stored in a memory and executing the programs using a processor. Note that in a case where the ECU is equipped with a multi-core processor, the engine controller 100 and the powertrain manager 200 can be respectively assigned to different cores or core groups.

In the block showing the powertrain manager 200 in FIG. 1, among various functions that the powertrain manager 200 is equipped with, some of the functions relating to control of the engine are represented by blocks. An arithmetic unit is allocated to each of these blocks. A program corresponding to each block is prepared in the ECU, and the functions of the respective arithmetic units are realized in the ECU by executing the programs using a processor. Note that in the case where the ECU is equipped with a multi-core processor, the arithmetic units configuring the powertrain manager 200 can be distributed and assigned to a plurality of cores.

An arithmetic unit 202 calculates a requested first torque and sends the calculated value to the engine controller 100. In the drawings, the requested first torque is described as "TQ1r". The first torque is a torque of a kind with respect to which the responsiveness required of the engine is not high and which it is sufficient to realize in the near future and need not be realized immediately. The requested first torque is a requested value of the first torque that the powertrain manager 200 requests with respect to the engine, and corresponds to the requested torque, in more detail, to the requested first torque in the present invention. A signal that is output in response to the state of the degree of opening of the accelerator pedal from an unshown accelerator position sensor is input to the arithmetic unit 202. The requested first torque is calculated based on the aforementioned signal. Note that the requested first torque is a shaft torque.

An arithmetic unit 204 calculates a requested third torque and sends the calculated value to the engine controller 100. In the drawings, the requested third torque is described as "TQ3r". The third torque is a torque of a kind with respect to which the urgency or priority is higher than the first torque and for which a high responsiveness is required of the engine. That is, the third torque is of a kind which is required to be realized immediately. The term "responsiveness" used here refers to the responsiveness when the torque is temporarily decreased. The requested third torque is a requested value of the third torque that the powertrain manager 200 requests with respect to the engine. The requested third torque that is calculated by the arithmetic unit 204 includes various kinds of torques requested from the vehicle control system, such as a torque requested for transmission control of the electronically controlled automatic transmission, a torque requested for traction control, and a torque requested for sideslip prevention control. While the first torque is a torque that the engine is required to generate stably or over an extended period, the third torque is a torque that the engine is required to generate suddenly or during a short period. Therefore, the arithmetic unit 204 outputs a valid value that is in accordance with the size of the torque that it is desired to realize only in a case where an event has actually arisen in which such a torque is required, and outputs an invalid value during a period in which such an event does not arise. The invalid value is set to a value that is larger than the maximum shaft torque that the engine can output.

An arithmetic unit 206 calculates a transmission gear ratio of the automatic transmission, and sends a signal indicating the transmission gear ratio to an unshown transmission controller. The transmission controller is realized as one function of the ECU, similarly to the powertrain manager 200 and the engine controller 100. A flag signal from the engine controller 100 is input to the arithmetic unit 206. In the drawings, the flag signal is described as "FLG". The flag signal is a signal that indicates that the state is one in which switching of the operation mode is being performed. During a period in which the flag signal is "on", the arithmetic unit 206 fixes the transmission gear ratio of the automatic transmission. That is to say, while switching of the operation mode is being performed, change of the transmission gear ratio by the automatic transmission is prohibited so that the operating state of the engine does not change to a large degree.

In response to a predetermined condition being satisfied, an arithmetic unit 208 sends a stop signal to the engine controller 100 that instructs the engine controller 100 to stop switching of the operation mode. In the drawings, the stop signal is described as "Stop". The predetermined condition is that a request to change the operating state of the engine to a large degree is output from the powertrain manager 200. For example, in a case where the transmission gear ratio of the automatic transmission is changed, and in a case where special requests regarding the ignition timing and the fuel injection amount are issued to the engine to warm up the catalyst, the stop signal is outputted from the arithmetic unit 208.

An arithmetic unit 210 calculates a requested second torque and sends the requested second torque to the engine controller 100. In the drawings, the requested second torque is described as "TQ2r". A second torque is a torque that is required from the engine regularly or for a long time period similarly to the first torque. A relation between the second torque and the first torque is analogous to the relation between the first torque and the third torque. That is to say, in a case of being seen from the side of the first torque, the first torque is a kind of torque that has higher urgency or priority than the second torque, and requests high responsiveness from the engine, that is, a kind of torque which is required to be realized at an earlier stage. The requested second torque is a requested value of the second torque which the powertrain manager 200 requests from the engine. Listing the three kinds of requested torques which are calculated in the powertrain manager 200 in sequence from the highest urgency or priority, that is, the highest responsiveness requested from the engine, the ranking is such that the requested third torque, the requested first torque and the requested second torque. The arithmetic unit 210 calculates the requested second torque based on the signal that responds to the degree of accelerator pedal opening. In the present embodiment, the requested second torque corresponds to the requested torque in the present invention, in more detail, the requested second torque. A torque obtained by removing a pulse component in a temporary torque reduction direction from the requested first torque can be also set as the requested second torque. Note that in the present embodiment, the requested second torque has the same value as the requested first torque unless especially described otherwise.

Next, the configuration of the engine controller 100 will be described. Interfaces 101, 102, 103, 104, and 105 are arranged between the engine controller 100 and the powertrain manager 200. The interface 101 corresponds to requested torque reception means in the present invention. The requested first torque is passed to the engine controller 100 at the interface 101. The stop signal is passed to the engine controller 100 at the interface 102. The flag signal is passed to the engine controller 100 at the interface 103. The requested third torque is passed to the engine controller 100 at the interface 104. The interface 105 corresponds to requested torque reception means in the present invention similarly to the interface 101, and the requested second torque is received and passed to the engine controller 100 at the interface 105.

In the block illustrating the engine controller 100 in FIG. 1, among the various functions with which the engine controller 100 is equipped, functions relating to coordinated operations of the three kinds of actuators, that is, a throttle 2, a VVT 8, and a WGV 10 as a first actuator, an injector 4 as a second actuator and an ignition device 6 as a third actuator are represented with blocks. An arithmetic unit is allocated to each of these blocks. A program corresponding to each block is prepared in the ECU, and the functions of the respective arithmetic units are realized in the ECU by executing the programs using a processor. Note that in the case where the ECU is equipped with a multi-core processor, the arithmetic units configuring the engine controller 100 can be distributed and assigned to a plurality of cores.

The configuration of the engine controller 100 is broadly divided into three large arithmetic units 120, 140 and 160. The large arithmetic unit 120 calculates values of various control parameters with respect to the engine. Target values of various control amounts with respect to the engine are included in the control parameters. In addition, a value calculated based on a requested value that is sent from the powertrain manager 200, and a value that is calculated within the large arithmetic unit 120 based on information relating to the operating state of the engine are included in the target values. Note that, while a requested value is a value of a control amount that is unilaterally requested from the powertrain manager 200 without taking the state of the engine into consideration, a target value is a value of a control amount that is set based on a realizable range that is decided depending on the state of the engine. The large arithmetic unit 120 is, more specifically, constituted by four arithmetic units 122, 124, 126, 128, and 130.

The arithmetic unit 122 calculates, as control parameters for the engine, a target air-fuel ratio, a virtual first air-fuel ratio, a virtual second air-fuel ratio, a target efficiency for switching, and a target third torque for switching. In the drawings, the target air-fuel ratio is described as "AFt", the virtual first air-fuel ratio is described as "AFh1", the virtual second air-fuel ratio is described as "AFh2", the target efficiency for switching is described as "ηtc", and the target third torque for switching is described as "TQ3c". The target air-fuel ratio is a target value of the air-fuel ratio to be realized by the engine, and is used for calculating a fuel injection amount. On the other hand, the virtual air-fuel ratio is a parameter that provides a conversion efficiency of the air amount to torque, and is used for calculating a target air amount. The target efficiency for switching is a target value of the ignition timing efficiency for switching of the operation mode, and is used for calculating the target air amount. The term "ignition timing efficiency" refers to the proportion of torque that is actually output with respect to the torque that can be output when the ignition timing is the optimal ignition timing. When the ignition timing is the optimal ignition timing, the ignition timing efficiency is 1 that is the maximum value thereof. Note that the term "optimal ignition timing" fundamentally refers to the MBT (minimum advance for best torque), and when a trace knock ignition timing is set, the term "optimal ignition timing" refers to the ignition timing that is located further on the retardation side among the MBT and the trace knock ignition timing. The target third torque for switching is a target value of the third torque for switching of the operation mode, and is used to switch the calculation of the ignition timing efficiency when switching the operation mode. Switching of the operation mode is executed by combining the values of these control parameters that are calculated with the arithmetic unit 122. The relation between the contents of the processing performed by the arithmetic unit 122 and switching of the operation mode will be described in detail later.

In addition to the requested first torque, the requested second torque, and the stop signal that are received from the powertrain manager 200, various kinds of information relating to the operating state of the engine such as the engine speed is also input to the arithmetic unit 122. Among these, information for determining the timing for switching the operation mode is the requested first torque. The requested third torque and the stop signal are used as information for determining whether switching of the operation mode is permitted or prohibited. When the stop signal is inputted, and when the requested third torque of a valid value is inputted, the arithmetic unit 122 does not execute processing relating to switching the operation mode. Further, during switching of the operation mode, that is, while executing calculation processing for switching the operation mode, the arithmetic unit 122 sends the aforementioned flag signal to the powertrain manager 200.

The arithmetic unit 124 calculates, as a control parameter for the engine, a torque that is classified as a first torque among torques that are necessary for maintaining the current operating state of the engine or for realizing a scheduled predetermined operating state. In this case, the torque that is calculated by the arithmetic unit 124 is referred to as "other first torque". In the drawings, the other first torque is described as "TQ1etc". The other first torque includes torque within a range of variation that can be achieved by only control of the air amount, out of torques necessary for keeping a predetermined idling speed in a case where the engine is in an idling state. The arithmetic unit 124 outputs a valid value only in a case where such a torque is actually required, and calculates an invalid value during a period in which such a torque is not required. The invalid value is set to a value that is larger than the maximum shaft torque that the engine can output.

The arithmetic unit 126 calculates, as a control parameter for the engine, a torque that is classified as a third torque among torques that are necessary for maintaining the current operating state of the engine or for realizing a scheduled predetermined operating state. In this case, the torque that is calculated by the arithmetic unit 126 is referred to as "other third torque". In the drawings, the other third torque is described as "TQ3etc". The other third torque includes torque requiring control of an ignition timing for achievement of the torque, out of torques that are required to keep a predetermined idling speed, in the case where the engine is an idling state. The arithmetic unit 126 outputs a valid value only in a case where such a torque is actually required, and calculates an invalid value during a period in which such a torque is not required. The invalid value is set to a value that is larger than the maximum shaft torque that the engine can output.

The arithmetic unit 128 calculates, as a control parameter for the engine, an ignition timing efficiency that is necessary for maintaining the current operating state of the engine or for realizing a scheduled predetermined operating state. In this case, the ignition timing efficiency that is calculated by the arithmetic unit 128 is referred to as "other efficiency". In the drawings, the other efficiency is described as "ηetc". An ignition timing efficiency that is necessary for warming up an exhaust purification catalyst when starting the engine is included in the other efficiency. The more the ignition timing efficiency is lowered, the less the amount of energy that is converted to torque will be among the energy generated by the combustion of fuel, and thus an amount of energy that is increased by an amount corresponding to the decrease in the energy converted to torque will be discharged to the exhaust passage together with the exhaust gas and used to warm up the exhaust purification catalyst. Note that, during a period in which it is not necessary to realize such efficiency, the efficiency value outputted from the arithmetic unit 128 is held at a value of 1 that is the maximum value.

The arithmetic unit 130 calculates, as a control parameter for the engine, a torque that is classified as a second torque among torques that are necessary to maintain the current operating state of the engine or to realize a predetermined operating state. In this case, the torque that is calculated by the arithmetic unit 130 is referred to as "other second torque". In the drawings, the other second torque is described as "TQ2etc". The arithmetic unit 130 outputs a valid value only in a case where such a torque is actually required, and calculates an invalid value during a period in which such a torque is not required. The invalid value is set at a value that is larger than the maximum shaft torque that the engine can output.

The requested first torque, the other first torque, the target air-fuel ratio, the virtual first air-fuel ratio, the virtual second air-fuel ratio, the target efficiency for switching, the other efficiency, the requested third torque, the target third torque for switching, the other third torque, the requested second torque and the other second torque are outputted from the large arithmetic unit 120 configured as described above. These control parameters are input to the large arithmetic unit 140. Note that, although the requested first torque, the requested third torque and the requested second torque that are received from the powertrain manager 200 are shaft torques, correction of these torques into indicated torques is performed at the large arithmetic unit 120. Correction of the requested torque to the indicated torque is performed by adding or subtracting a friction torque, an auxiliary driving torque and a pump loss to or from the requested torque. Note that, torques such as the target third torque for switching that are calculated within the large arithmetic unit 120 are each calculated as an indicated torque.

Next, the large arithmetic unit 140 will be described. As described above, various engine control parameters are sent to the large arithmetic unit 140 from the large arithmetic unit 120. Among these, the requested first torque and the other first torque are requests with respect to control amounts that belong to the same category, and these cannot be realized simultaneously. Likewise, the requested third torque, the other third torque and the target third torque for switching are requests with respect to control amounts that belong to the same category, and these cannot be realized simultaneously. Likewise, the target efficiency for switching and the other efficiency are requests with respect to control amounts that belong to the same category, and these cannot be realized simultaneously. Likewise, the requested second torque, and the other second torque are requests with respect to control amounts that belong to the same category, and these cannot be realized simultaneously. Consequently, processing is necessary that performs a mediation process for each control amount category. As used herein, the term "mediation" refers to a computation process for obtaining a single numerical value from a plurality of numerical values, such as, for example, selecting a maximum value, selecting a minimum value, averaging, or superimposing, and a configuration can also be adopted in which the mediation process appropriately combines a plurality of kinds of computation processes. To execute such kind of mediation for each control amount category, the large arithmetic unit 140 includes four arithmetic units 142, 144, 146, and 148.

The arithmetic unit 142 is configured to perform a mediation process with respect to the first torque. The requested first torque and the other first torque are inputted to the arithmetic unit 142. The arithmetic unit 142 performs a mediation process on these values, and outputs a torque that is obtained as the mediation result as a target first torque that is finally determined. In the drawings, the finally determined target first torque is described as "TQ1t". Minimum value selection is used as the mediation method in the arithmetic unit 142. Accordingly, in a case where a valid value is not output from the arithmetic unit 124, the requested first torque that is provided from the powertrain manager 200 is calculated as the target first torque.

The arithmetic unit 144 is configured to perform a mediation process with respect to the ignition timing efficiency. The target efficiency for switching and the other efficiency are inputted to the arithmetic unit 144. The arithmetic unit 144 performs a mediation process on these values, and outputs an efficiency that is obtained as the mediation result as a target efficiency that is finally determined. In the drawings, the finally determined target efficiency is described as "ηt". Minimum value selection is used as the mediation method in the arithmetic unit 144. From the viewpoint of fuel consumption performance, it is preferable that the ignition timing efficiency is 1 which is the maximum value thereof. Therefore, as long as no special event occurs, the target efficiency for switching that is calculated by the arithmetic unit 122 and the other efficiency that is calculated by the arithmetic unit 128 are each maintained at a value of 1 that is the maximum value. Accordingly, the value of the target efficiency that is output from the arithmetic unit 144 is fundamentally 1, and a value that is less than 1 is only selected in a case where an event of some kind has occurred.

The arithmetic unit 146 is configured to perform a mediation process with respect to the third torque. The requested third torque, the other third torque, and the target third torque for switching are inputted to the arithmetic unit 146. The arithmetic unit 146 performs a mediation process on these values, and outputs a torque that is obtained as the mediation result as a target third torque that is finally determined. In the drawings, the finally determined target third torque is described as "TQ3t". Minimum value selection is used as the mediation method in the arithmetic unit 146. The third torque, including the target third torque for switching, is fundamentally an invalid value, and is switched to a valid value showing the size of the torque it is desired to realize only in a case where a specific event has occurred. Accordingly, the target third torque that is output from the arithmetic unit 146 is also fundamentally an invalid value, and a valid value is selected in only a case where an event of some kind has occurred.

The arithmetic unit 148 is configured to perform a mediation process with respect to the second torque. The requested second torque and the other second torque are inputted to the arithmetic unit 148. The arithmetic unit 148 performs a mediation process on these values, and outputs a torque that is obtained as the mediation result as a target second torque that is finally determined. In the drawings, the finally determined target second torque is described as "TQ2t". Minimum value selection is used as the mediation method in the arithmetic unit 148. Accordingly, when a valid value is not outputted from the arithmetic unit 130, the requested second torque which is given from the powertrain manager 200 is calculated as the target second torque.

The target first torque, the target efficiency, the virtual first air-fuel ratio, the virtual second air-fuel ratio, the target air-fuel ratio, the target third torque, and the target second torque are output from the large arithmetic unit 140 that is configured as described above. These control parameters are input to the large arithmetic unit 160.

The large arithmetic unit 160 corresponds to an inverse model of the engine, and is constituted by a plurality of models that are represented by a map or a function. Operation amounts of the respective actuators 2, 4, 6, 8, and 10 for coordinated operations are calculated by the large arithmetic unit 160. Among the control parameters that are inputted from the large arithmetic unit 140, the target first torque, the target third torque, and the target second torque are each handled as target values of the torque with respect to the engine. However, the target third torque takes priority over the target first torque. In the large arithmetic unit 160, calculation of operation amounts of the respective actuators 2, 4, 6, 8, and 10 is performed so as to achieve the target third torque in a case where the target third torque is a valid value, or so as to achieve the target first torque in a case where the target third torque is an invalid value. Calculation of the operation amounts is performed so as to also achieve the target air-fuel ratio and the target efficiency simultaneously with the target torque. That is, according to the controlling device of the present embodiment, the torque, the efficiency, and the air-fuel ratio are used as control amounts of the engine, and air amount control, ignition timing control, and fuel injection amount control are conducted based on the target values of these three kinds of control amounts.

The large arithmetic unit 160 includes a plurality of arithmetic units 182, 184, 166, 186, 168, 170, 172, 174, 176, and 178. Among these arithmetic units, the arithmetic units 182, 184, 166, 186, and 178 relate to air amount control, the arithmetic units 168, 170, and 172 relate to ignition timing control, the arithmetic units 174 and 176 relate to fuel injection amount control. Hereunder, the functions of the respective arithmetic units are described in detail in order, starting from the arithmetic units relating to air amount control.

The arithmetic unit 182 is further configured by two arithmetic units 190 and 192. The target first torque, the target efficiency and the virtual first air-fuel ratio are inputted to the arithmetic unit 190. Further, the target second torque, the target efficiency and the virtual second air-fuel ratio are inputted to the arithmetic unit 192. The arithmetic unit 182 corresponds to target air amount calculation means in the present invention.

The arithmetic unit 190 corresponds to target first air amount calculation means of the present invention, and uses the target efficiency and the virtual first air-fuel ratio to back-calculate a target air amount (hereinafter, referred to as "target first air amount") for achieving the target first torque from the target first torque. In this calculation, the target efficiency and the virtual first air-fuel ratio are used as parameters that provide a conversion efficiency of the air amount to torque. Note that, in the present invention, the term "air amount" refers to the amount of air that is drawn into the cylinders, and a charging efficiency or a load factor, which are non-dimensional equivalents of the air amount, are within an equal range to the air amount in the present invention.

The arithmetic unit 190 first calculates a target torque for air amount control by dividing the target first torque by the target efficiency. If the target efficiency is less than 1, the target torque for air amount control becomes larger than the target first torque. This means that a requirement with respect to the air amount control by the actuators 2, 8, and 10 is to enable the potential output of torque that is greater than the target first torque. On the other hand, if the target efficiency is 1, the target first torque is calculated as it is as the target torque for air amount control.

Next, the arithmetic unit 190 converts the target torque for air amount control to a target air amount using a torque-air amount conversion map. The torque-air amount conversion map is prepared on the premise that the ignition timing is the optimal ignition timing, and is a map in which the torque and the air amount are associated using various engine status amounts, such as the engine speed and the air-fuel ratio as keys. This map is created based on data obtained by testing the engine. Actual values or target values of the engine status amounts are used to search the torque-air amount conversion map. With regard to the air-fuel ratio, the virtual air-fuel ratio is used to search the map. Accordingly, at the arithmetic unit 190, the air amount that is required to realize the target torque for air amount control under the virtual first air-fuel ratio is calculated as the target first air amount. In the drawings, the target first air amount is described as "KLt1".

The arithmetic unit 192 corresponds to target second air amount calculation means in the present invention, and calculates a target air amount (hereinafter referred to as a target second air amount) for achieving the target second torque backwards from the target second torque by using a target efficiency and a virtual second air-fuel ratio by the method common to the aforementioned arithmetic unit 190. In the drawings, the target second air amount is described as "KL2t". In calculation of the target second air amount, the target efficiency and the virtual air-fuel ratio are used as parameters that give conversion efficiency of the air amount into torque.

The arithmetic unit 184 is further configured by two arithmetic units 194 and 196. The target first air amount is inputted to the arithmetic unit 194. Further, the target second air amount is inputted to the arithmetic unit 196.

The arithmetic unit 194 back-calculates a target intake pipe pressure that is a target value of the intake pipe pressure from the target first air amount. A map that describes the relation between an air amount that is drawn into the cylinders through the intake valve and the intake pipe pressure is used to calculate the target intake pipe pressure. The relation between the air amount and the intake pipe pressure changes depending on the valve timing. Therefore, when calculating the target intake pipe pressure, a parameter value of the aforementioned map is determined based on the current valve timing. The target intake pipe pressure is described as "Pmt" in the drawings.

The arithmetic unit 196 calculates a target turbocharging pressure backwards from the target second air amount. In the drawings, the target turbocharging pressure is described as "Pct". In calculation of the target turbocharging pressure, the target second air amount is converted into the intake pipe pressure first by the method common to the case of calculating the target intake pipe pressure. Subsequently, a reserve pressure is added to the intake pipe pressure which is obtained by conversion of the target second air amount, and a total value thereof is calculated as the target turbocharging pressure. A reserve pressure is a minimum lowest margin of the turbocharging pressure to the intake pipe pressure. Note that the reserve pressure may be a fixed value, but may be also changed in an interlocking manner with the intake pipe pressure, for example.

The arithmetic unit 166 calculates a target degree of throttle opening that is a target value of the degree of throttle opening based on the target intake pipe pressure. An inverse model of the air model is used to calculate the target degree of throttle opening. The air model is a physical model which is obtained as the result of modeling the response characteristic of the intake pipe pressure with respect to operation of the throttle 2. Therefore, the target degree of throttle opening that is required to achieve the target intake pipe pressure can be back-calculated from the target intake pipe pressure using the inverse model thereof. The target degree of throttle opening is described as "TA" in the drawings. The target degree of throttle opening calculated by the arithmetic unit 166 is converted to a signal for driving the throttle 2, and is sent to the throttle 2 through an interface 111 of the ECU. The arithmetic units 194 and 166 correspond to first actuator control means in the present invention, in more detail, intake property variable actuator control means that is included in the first actuator control means.

The arithmetic unit 178 calculates a target valve timing that is a target value of the valve timing based on the target air amount. A map in which the air amount and the valve timing are associated using the engine speed as an argument is utilized to calculate the target valve timing. The target valve timing is the optimal displacement angle of the VVT 8 for achieving the target air amount based on the current engine speed, and the specific value thereof is determined by adaptation for each air amount and each engine speed. However, at a time of acceleration when the target air amount increases to a large degree at a high speed, the target valve timing is corrected to an advance side from the valve timing which is determined from the map in order to increase the actual air amount at a maximum speed to cause the actual air amount to follow the target air amount. The target valve timing is described as "VT" in the drawings. The target valve timing calculated by the arithmetic unit 178 is converted to a signal for driving the VVT 8, and is sent to the VVT 8 through an interface 112 of the ECU. The arithmetic unit 178 also corresponds to the first actuator control means in the present invention, in more detail, the intake property variable actuator control means which is included in the first actuator control means.

The arithmetic unit 186 calculates a target degree of wastegate valve opening that is a target value of a degree of wastegate valve opening based on the target turbocharging pressure. In the drawings, the target degree of wastegate valve opening is described as "WGV". In calculation of the target degree of wastegate valve opening, a map or a model that relates the turbocharging pressure with the degree of wastegate valve opening is used. The target degree of wastegate valve opening which is calculated in the arithmetic unit 186 is converted into a signal that drives a WGV 10 and is transmitted to the WGV 10 through the interface 115. The arithmetic unit 186 corresponds to the first actuator control means in the present invention, in more detail, the turbocharging property variable actuator control means which is included in the first actuator control means. Note that as an operation amount of the WGV 10, a duty ratio of a solenoid that drives the WGV 10 may be adopted instead of the degree of wastegate valve opening.

Next, the functions of the arithmetic units relating to ignition timing control will be described. The arithmetic unit 168 calculates an estimated torque based on the actual degree of throttle opening and the valve timing realized by the above described air amount control. The term "estimated torque" as used in the present description refers to torque that can be output in a case where the ignition timing is set to the optimal ignition timing based on the current degree of throttle opening and valve timing and the target air-fuel ratio. The arithmetic unit 168 first calculates an estimated air amount based on a measured value of the degree of throttle opening and a measured value of the valve timing using a forward model of the aforementioned air model. The estimated air amount is an estimated value of an air amount that is actually realized by the current degree of throttle opening and valve timing. Next, the arithmetic unit 168 converts the estimated air amount to an estimated torque using the torque-air amount conversion map. The target air-fuel ratio is used as a search key when searching the torque-air amount conversion map. The estimated torque is described as "TQe" in the drawings.

The target third torque and the estimated torque are inputted to the arithmetic unit 170. The arithmetic unit 170 calculates an indicated ignition timing efficiency that is an indicated value of the ignition timing efficiency based on the target third torque and the estimated torque. The indicated ignition timing efficiency is expressed as a proportion of the target third torque to the estimated torque. However, an upper limit is defined for the indicated ignition timing efficiency, and the value of the indicated ignition timing efficiency is set as 1 in a case where the proportion of the target third torque with respect to the estimated torque exceeds 1. The indicated ignition timing efficiency is described as "ηi" in the drawings.

The arithmetic unit 172 calculates the ignition timing based on the indicated ignition timing efficiency. More specifically, the arithmetic unit 172 calculates the optimal ignition timing based on engine status amounts such as the engine speed, the requested torque and the air-fuel ratio, and calculates a retardation amount with respect to the optimal ignition timing based on the indicated ignition timing efficiency. When the indicated ignition timing efficiency is 1, the retardation amount is set as zero, and the retardation amount is progressively increased as the indicated ignition timing efficiency decreases from 1. The arithmetic unit 172 then calculates the result of addition of the retardation amount to the optimal ignition timing as a final ignition timing. A map in which the optimal ignition timing and various engine status amounts are associated can be used to calculate the optimal ignition timing. A map in which the retardation amount, the ignition timing efficiency and various engine status amounts are associated can be used to calculate the retardation amount. The target air-fuel ratio is used as a search key to search these maps. The ignition timing is described as "SA" in the drawings. The ignition timing calculated by the arithmetic unit 172 is converted to a signal for driving the ignition device 6, and is sent to the ignition device 6 through an interface 113 of the ECU. The arithmetic units 168, 170 and 172 correspond to third actuator control means in the present invention.

Next, functions of the arithmetic units relating to fuel injection amount control will be described. The arithmetic unit 174 calculates an estimated air amount based on a measured value of the degree of throttle opening and a measured value of the valve timing using the forward model of the air model described above. The estimated air amount calculated by the arithmetic unit 174 is preferably an air amount that is predicted to arise at a timing at which the intake valve closes. An air amount that will arise in the future can be predicted, for example, based on the target degree of throttle opening by setting a delay time period from calculation of the target degree of throttle opening until the output thereof. The estimated air amount is described as "KLe" in the drawings.

The arithmetic unit 174 calculates a fuel injection amount, that is, a fuel supply amount, that is required to achieve the target air-fuel ratio based on the target air-fuel ratio and the estimated air amount. Calculation of the fuel injection amount is executed when the timing for calculating a fuel injection amount arrives with respect to each cylinder. The fuel injection amount is described as "TAU" in the drawings. The fuel injection amount calculated by the arithmetic unit 174 is converted to a signal for driving the injector 4, and is sent to the injector 4 through an interface 114 of the ECU. The arithmetic units 174 and 176 correspond to second actuator control means in the present invention.

The foregoing is an overview of the logic of the ECU according to the present embodiment. Next, the arithmetic unit 122 that is a main portion of the ECU according to the present embodiment will be described in detail.

Figure 2:
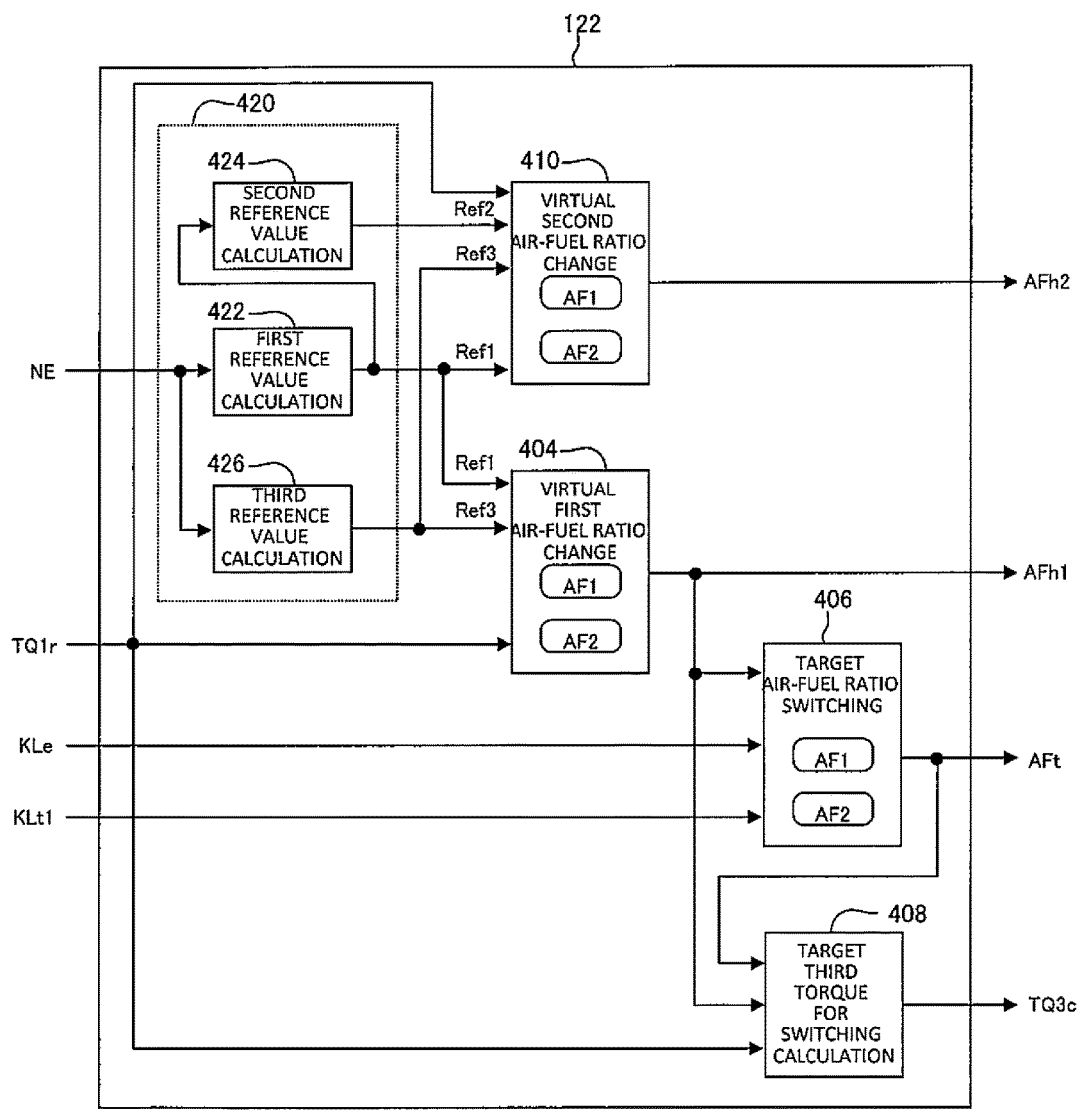
FIG. 2 is a block diagram illustrating a logic of switching of an operation mode of the controlling device according to the embodiment of the present invention.

The logic of the arithmetic unit 122 is illustrated by means of a block diagram in FIG. 2. Inside the block illustrating the arithmetic unit 122 in FIG. 2, among the various functions that the arithmetic unit 122 is equipped with, functions relating to switching of the operation mode are represented by blocks. An arithmetic unit is allocated to each of these blocks. A program corresponding to each block is prepared in the ECU, and the functions of the respective arithmetic units are realized in the ECU by executing the programs using a processor. Note that in the case where the ECU includes a multi-core processor, arithmetic units 404, 406, 408, 410, and 420 that configure the arithmetic unit 122 can be distributed and assigned to a plurality of cores.

First, the arithmetic unit 420 will be described. The arithmetic unit 420 is further configured by three arithmetic units 422, 424 and 426. The arithmetic unit 422 calculates a first reference value with respect to torque. The first reference value is a torque to be a boundary between the lean mode and the stoichiometric mode at the time of deceleration, and a value that is optimal from the viewpoint of fuel efficiency performance, exhaust gas performance, and drivability is adapted for each engine speed. The arithmetic unit 422 calculates the first reference value which is suitable for to the engine speed with reference to a map which is prepared in advance. In the drawings, the first reference value is described as "Ref1".

The arithmetic unit 424 calculates a second reference value with respect to torque. The second reference value is a reference value larger than the first reference value, and is a value of the torque which is, in the near future, to reach the torque to be the boundary between the lean mode and the stoichiometric mode at the time of deceleration. The arithmetic unit 424 calculates a torque with a predetermined amount added to the first reference value, and determines a value of the torque which is obtained by calculation as a second reference value. Note that as for calculation of the second reference value, the second reference value which is suitable for the engine speed may be calculated with reference to a map that is prepared in advance by the method common to the case where the first reference value is calculated in the arithmetic unit 422. In the drawings, the second reference value is described as "Ref2".

The arithmetic unit 426 calculates a third reference value for the torque. The third reference value is a torque that serves as a boundary between a stoichiometric mode and a lean mode at the time of acceleration, and the optimal value is adapted for each engine speed from the viewpoint of fuel consumption performance, exhaust gas performance and drivability. The arithmetic unit 426 refers to a previously prepared map to calculate a third reference value that is suitable for the engine speed. Note that the third reference value may be the same value as the aforementioned first reference value. The third reference value is described as "Ref3" in the drawings.

Next, the arithmetic unit 404 will be described. The requested first torque is inputted to the arithmetic unit 404. In addition, the first reference value and the third reference value calculated by the arithmetic unit 420 is set with respect to the arithmetic unit 404. The arithmetic unit 404 changes a value of the virtual first air-fuel ratio that is used to calculate the target air amount, based on the relation between the requested first torque and the first reference value that are inputted. More specifically, the arithmetic unit 404 switches the virtual first air-fuel ratio from a first air-fuel ratio to a second air-fuel ratio or from the second air-fuel ratio to the first air-fuel ratio. The first air-fuel ratio is the theoretical air-fuel ratio (for example, 14.5). The first air-fuel ratio is described as "AF1" in the drawings. The second air-fuel ratio is a leaner air-fuel ratio than the first air-fuel ratio, and is set to a certain fixed value (for example, 22.0). The second air-fuel ratio is described as "AF2" in the drawings. The arithmetic unit 404 corresponds to parameter value changing means, in more detail, to first parameter value changing means included in the parameter value changing means in the present invention.

During a period in which the requested first torque is greater than the first reference value, the arithmetic unit 404 sets the virtual first air-fuel ratio to the first air-fuel ratio in response to the requested first torque being greater than the first reference value. If the requested first torque decreases in accordance with a deceleration request of the driver and in due course becomes less than the first reference value, the arithmetic unit 404 switches the first virtual air-fuel ratio from the first air-fuel ratio to the second air-fuel ratio in response to the requested first torque decreasing to a value that is less than or equal to the first reference value. Meanwhile, during a period in which the requested first torque is smaller than the third reference value, the arithmetic unit 404 sets the virtual first air-fuel ratio at the second air-fuel ratio in response to the requested first torque being smaller than the third reference value. When the requested first torque increases in accordance with an acceleration request of the driver, and in due course the requested first torque becomes larger than the third reference value, the arithmetic unit 404 switches the virtual first air-fuel ratio to the first air-fuel ratio from the second air-fuel ratio in response to the requested first torque increasing to the third reference value or larger.

Next, the arithmetic unit 410 will be described. The requested first torque is inputted to the arithmetic unit 410. Further, the first reference value, the second reference value and the third reference value which are calculated in the arithmetic unit 420 are set to the arithmetic unit 410. Further, respective values of the first air-fuel ratio and the second air-fuel ratio which are the same as those set to the arithmetic unit 404 are set to the arithmetic unit 410.

The arithmetic unit 410 changes the value of the virtual second air-fuel ratio for use in calculation of the target air amount based on the relation between the inputted requested first torque and the reference value. The arithmetic unit 410 corresponds to parameter value changing means in the present invention, in more detail, second parameter value changing means that is included in the parameter value changing means.

First of all, change of the virtual second air-fuel ratio will be described, which is in the situation where the requested first torque decreases in response to the deceleration request by the driver. In a period in which the requested first torque is larger than the requested second reference value, the arithmetic unit 410 sets the virtual second air-fuel ratio at the first air-fuel ratio in response to the requested first torque being larger than the second reference value. When the requested first torque becomes smaller than the second reference value in due course, the arithmetic unit 410 starts to change the virtual second air-fuel ratio from the first air-fuel ratio to the lean side in response to the decrease of the requested first torque to the second reference value or lower. Subsequently, the arithmetic unit 410 gradually changes the virtual second air-fuel ratio from the first air-fuel ratio to the second air-fuel ratio, in accordance with the requested first torque decreasing from the second reference value to the first reference value. That is to say, at the time of deceleration when the requested first torque decreases, the virtual second air-fuel ratio is gradually changed from the first air-fuel ratio to the second-air fuel ratio in a period until the requested first torque reduces from the second reference value to the first reference value, prior to the virtual first air-fuel ratio being switched from the first air-fuel ratio to the second air-fuel ratio. Note that the method for gradually changing the virtual second air-fuel ratio is not limited. For example, if a first order lag filter processing and a weighted average processing are used, the virtual second air-fuel ratio can be gradually changed from the first air-fuel ratio to the second air-fuel ratio. As a matter of course, the virtual second air-fuel ratio may be changed from the first air-fuel ratio to the second air-fuel ratio at a constant rate of change.

Change of the virtual second air-fuel ratio in the situation where the requested first torque increases in accordance with the acceleration request by the driver will be described. In a period in which the requested first torque is smaller than the third reference value, the arithmetic unit 404 sets the virtual second air-fuel ratio at the second air-fuel ratio in response to the requested first torque being smaller than the third reference value. When the requested first torque exceeds the third reference value in due course, the arithmetic unit 404 starts to change the virtual second air-fuel ratio to the rich side from the second air-fuel ratio in response to the increase of the requested first torque to the third reference value or higher. Subsequently, the arithmetic unit 404 gradually changes the virtual second air-fuel ratio from the second air-fuel ratio to the first air-fuel ratio in accordance with the requested first torque further increasing from the third reference value. That is to say, at the time of acceleration at which the requested first torque increases, the virtual second air-fuel ratio is gradually changed from the second air-fuel ratio to the first air-fuel ratio in accordance with the further increase of the requested first torque, after the virtual first air-fuel ratio is switched from the second air-fuel ratio to the first air-fuel ratio.

Next, the arithmetic unit 406 will be described. The arithmetic unit 406 corresponds to target air-fuel ratio switching means of the present invention. The first air-fuel ratio that is used in the stoichiometric mode and the second air-fuel ratio that is used in the lean mode are previously set as default values of the target air-fuel ratio in the arithmetic unit 406. The virtual first air-fuel ratio determined by the arithmetic unit 404, a value of the target first air amount calculated in a previous step by the arithmetic unit 190, and a value of the estimated air amount calculated in a previous step by the arithmetic unit 174 are inputted to the arithmetic unit 406.

First, switching of the target air-fuel ratio under a situation where the requested first torque is decreasing in accordance with a deceleration request of the driver will be described. Upon detecting that the virtual first air-fuel ratio that is inputted from the arithmetic unit 404 is switched from the first air-fuel ratio to the second air-fuel ratio, the arithmetic unit 406 calculates a difference between the target first air amount and the estimated air amount. Subsequently, when the estimated air amount sufficiently approaches the target first air amount, more specifically, when the difference between the first target air amount and the estimated air amount becomes equal to or smaller than a predetermined threshold value, the arithmetic unit 406 switches the target air-fuel ratio from the first air-fuel ratio to the second air-fuel ratio. That is to say, at the time of deceleration when the requested first torque decreases, switching of the target air-fuel ratio from the first air-fuel ratio to the second air-fuel ratio is performed, after switching of the virtual air-fuel ratio from the first air-fuel ratio to the second air-fuel ratio. By switching of the target air-fuel ratio, the operation mode is switched from the stoichiometric mode to the lean mode.

Switching of the target air-fuel ratio under a situation where the requested first torque is increasing in accordance with the acceleration request of the driver will be described. Upon detecting that the virtual first air-fuel ratio that is inputted from the arithmetic unit 404 is switched from the second air-fuel ratio to the first air-fuel ratio, the arithmetic unit 406 switches the target air-fuel ratio from the second air-fuel ratio to the first air-fuel ratio in response thereto. That is to say, at the time of acceleration when the requested first torque increases, switching of the target air-fuel ratio from the second air-fuel ratio to the first air-fuel ratio is performed, simultaneously with switching of the virtual first air-fuel ratio from the second air-fuel ratio to the first air-fuel ratio. By switching of the target air-fuel ratio, the operation mode is switched from the lean mode to the stoichiometric mode.

Finally the arithmetic unit 408 will be described. The arithmetic unit 408 calculates the target third torque for switching. As described above, the target third torque for switching is inputted to the arithmetic unit 146 together with the requested third torque and the other third torque, and the smallest value among those values is selected by the arithmetic unit 146. The requested third torque and the other third torque are normally invalid values, and are switched to valid values only in a case where a special event has occurred. The same applies to the target third torque for switching also, and the arithmetic unit 430 normally sets the output value of the target third torque for switching to an invalid value.

The requested first torque, the target air-fuel ratio, and the virtual first air-fuel ratio are inputted to the arithmetic unit 408. According to the logic of the arithmetic units 404 and 408, the target air-fuel ratio and the virtual first air-fuel ratio match before switching the operation mode, and also match after the switching processing is completed. However, during the processing to switch the operation mode, a gap arises between the target air-fuel ratio and the virtual first air-fuel ratio. The arithmetic unit 408 calculates the target third torque for switching that has a valid value, only during a period in which a gap arises between the target air-fuel ratio and the virtual first air-fuel ratio. In this case, the requested first torque is used as the valid value of the target third torque for switching. That is, during a period in which a gap arises between the target air-fuel ratio and the virtual first air-fuel ratio, the requested first torque is output from the arithmetic unit 408 as the target third torque for switching.

The foregoing is a detailed description of the logic of the arithmetic unit 122, that is, the logic for switching the operation mode that is adopted in the present embodiment. Next, control results in a case where engine control is executed in accordance with the above described logic will be described based on a time chart illustrating an image thereof.

First, a control result according to a comparative example with respect to the logic which is adopted in the present embodiment will be described. The control result according to the comparative example is the result in the case of calculating the target second air amount for achieving the target second torque backwards from the target second torque by using the target efficiency and the virtual first air-fuel ratio in an arithmetic unit corresponding to the arithmetic unit 192 in the present embodiment. That is to say, the comparative example shows the control result in the case of performing air amount control by only the virtual first air-fuel ratio without using the virtual second air-fuel ratio. Since the present invention solves a concern that the comparative example has, the advantage of the logic which is adopted in the present embodiment is considered to be clearer by clarifying the control result according to the comparative example and the concern existing therein in advance.

Figure 3:
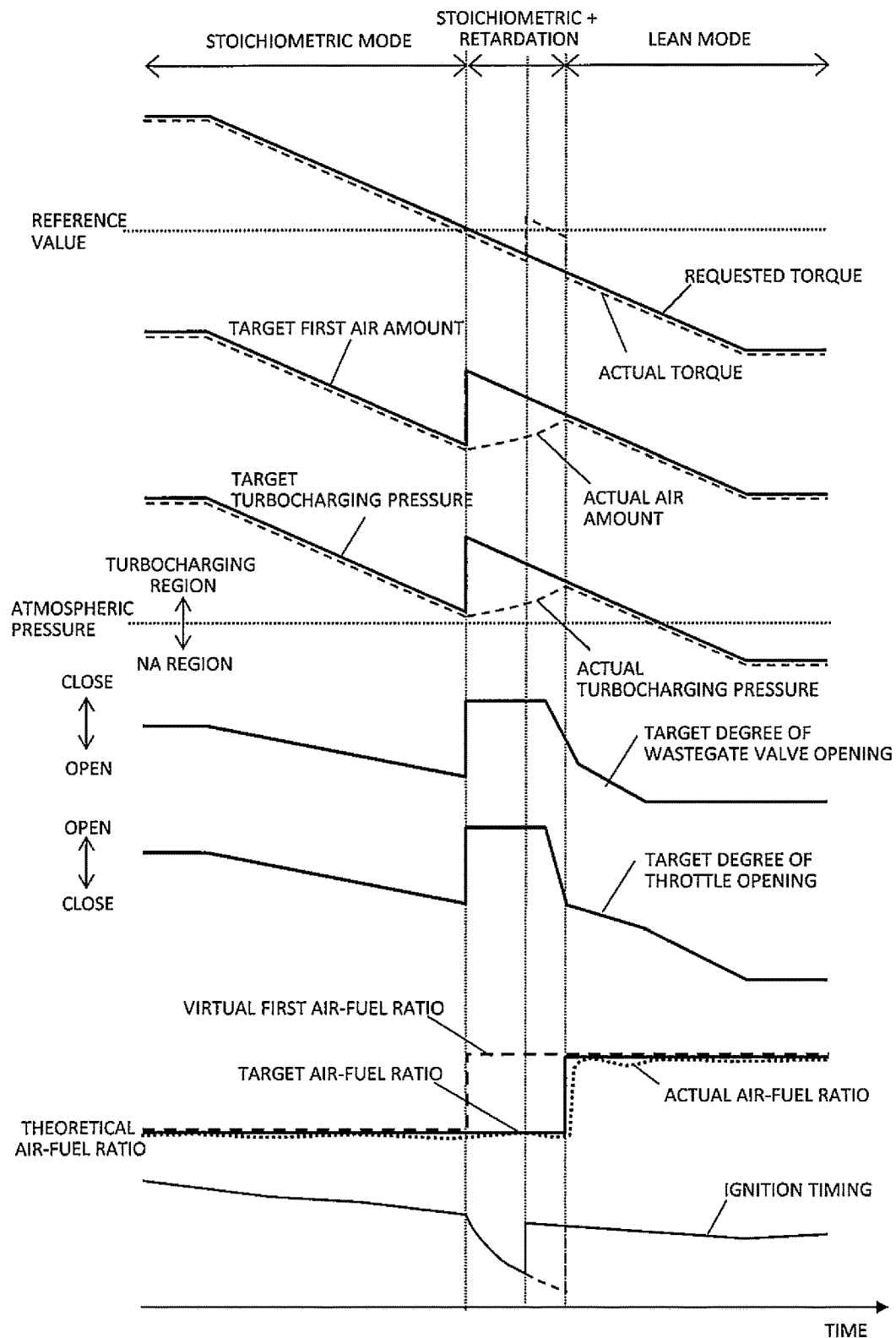
FIG. 3 is a time chart illustrating an image of a control result at a time of deceleration according to a comparative example.
Figure 4:
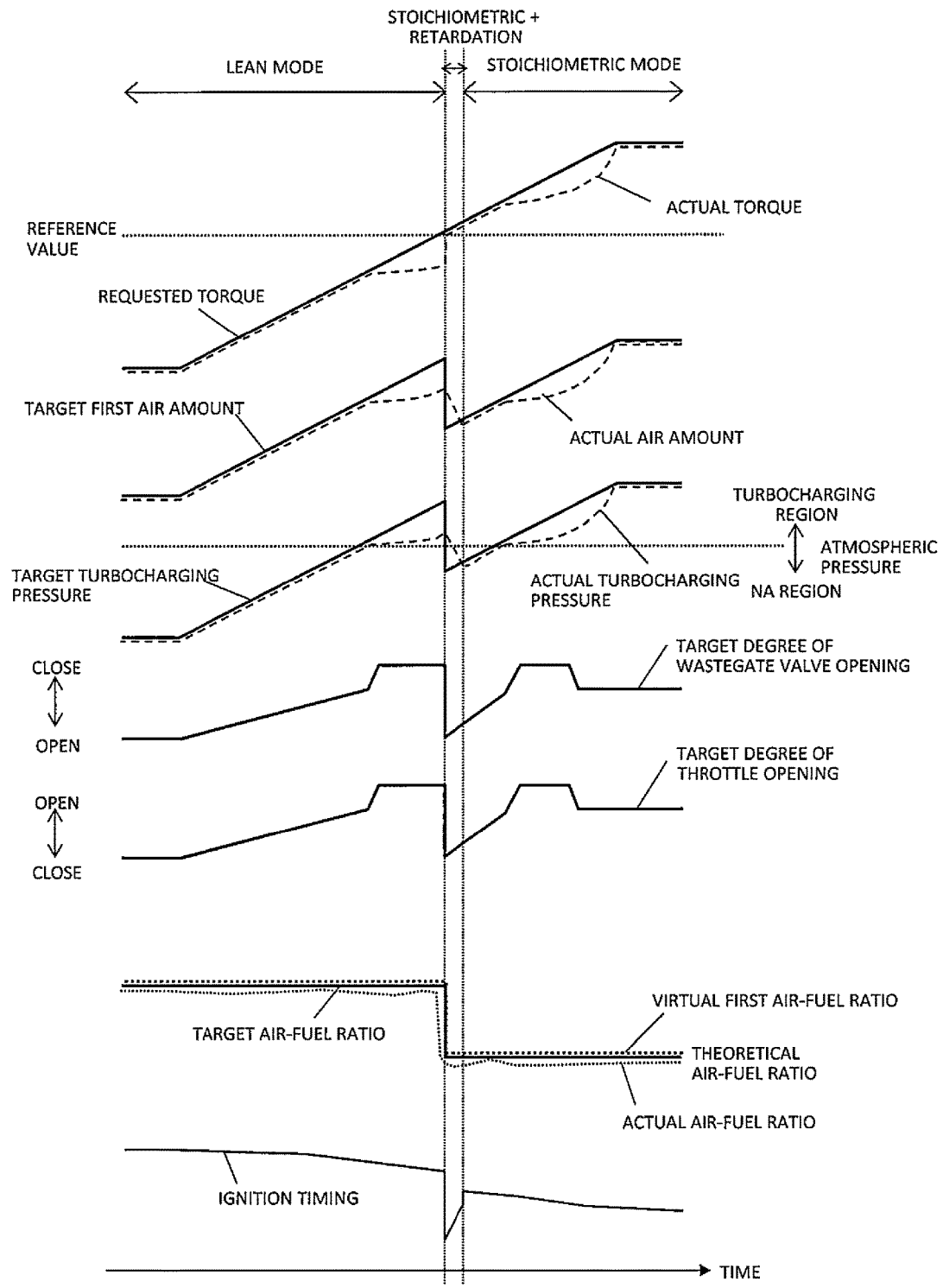
FIG. 4 is a time chart illustrating an image of a control result at a time of acceleration according to the comparative example.

FIG. 3 is a time chart illustrating an image of a control result at a time of deceleration according to the comparative example. FIG. 4 is a time chart illustrating an image of a control result at the time of acceleration according to the comparative example. In both of FIG. 3 and FIG. 4, a chart on a first tier illustrates changes over time of the requested torque and the actual torque. A chart on a second tier illustrates changes over time of the target first air amount and the actual air amount. A chart on a third tier illustrates changes over time of the target turbocharging pressure and the actual turbocharging pressure. A chart on a fourth tier illustrates a change over time of the target degree of wastegate valve opening. A chart on a fifth tier illustrates a change over time of the target degree of throttle opening. A chart on a sixth tier illustrates changes over time of the target air-fuel ratio and the virtual first air-fuel ratio which is the parameter for calculation of the target air amount. The virtual first air-fuel ratio is a parameter that gives the conversion efficiency of the air amount into the torque, and the air amount necessary to achieve the requested torque under the virtual first air-fuel ratio is the target air amount. In the comparative example, the target air-fuel ratio and the virtual air-fuel ratio are both switched in a step manner between the first air-fuel ratio (the theoretical air-fuel ratio) and the second air-fuel ratio (the lean air-fuel ratio). Further, in the chart, a change over time of the actual air-fuel ratio is illustrated together with these air-fuel ratios. A chart on a seventh tier illustrates a change over time of the ignition timing.

The control result illustrated in FIG. 3 will be considered first. According to the comparative example illustrated in FIG. 3, at the time of deceleration, the virtual first air-fuel ratio is switched from the first air-fuel ratio to the second air-fuel ratio prior to switching of the target air-fuel ratio from the first air-fuel ratio to the second air-fuel ratio. By the switch, the target first air amount increases in a step manner to the air amount corresponding to the second air-fuel ratio. Subsequently, the target degree of throttle opening changes to the opening side to a large degree in response to the increase of the target first air amount, and the actual air amount increases to track the target first air amount.

Further, according to the comparative example illustrated in FIG. 3, the virtual first air-fuel ratio is switched from the first air-fuel ratio to the second air-fuel ratio, whereby the target turbocharging pressure increases to the turbocharging pressure corresponding to the second air-fuel ratio in a step manner. Subsequently, the target degree of wastegate valve opening changes to a closing side to a large degree in response to the increase of the target turbocharging pressure, and the actual turbocharging pressure increases to track the target turbocharging pressure.

As above, according to the comparative example illustrated in FIG. 3, the target first air amount is increased prior to switch of the target air-fuel ratio, whereby the air amount can be increased to the amount corresponding to the second air-fuel ratio before the time point of switch of the target air-fuel ratio. Further, the ignition timing is retarded from an optimal ignition timing by the amount by which the target first air amount is increased prior to switch of the target air-fuel ratio, and therefore, increase of the torque by the excessive air amount is cancelled out by a decrease in the torque by retardation of the ignition timing.

A control result illustrated in FIG. 4 will be considered. According to a comparative example illustrated in FIG. 4, the virtual first air-fuel ratio is switched from the second air-fuel ratio to the first air-fuel ratio in a same timing as switch of the target air-fuel ratio to the first air-fuel ratio from the second air-fuel ratio at the time of acceleration. By the switch, the target first air amount decreases in a step manner to the air amount corresponding to the first air-fuel ratio. Subsequently, the target degree of throttle opening changes to the closing side to a large degree in response to the decrease of the target first air amount, and the actual air amount decreases to track the target first air amount.

Further, according to the comparative example illustrated in FIG. 4, the target turbocharging pressure decreases in a step manner to the turbocharging pressure corresponding to the first air-fuel ratio by the virtual first air-fuel ratio being switched from the second air-fuel ratio to the first air-fuel ratio. Subsequently, the target degree of wastegate valve opening changes to the opening side to a large degree in response to the decrease of the target turbocharging pressure, and the actual turbocharging pressure decreases to track the target turbocharging pressure. At this time, the actual air amount becomes excessively larger than the target air amount for a while due to a delay in response of air to an operation of the actuator, but the ignition timing is retarded from the optimal ignition timing, whereby the increase of torque due to the excessive air amount is cancelled out by a decrease in torque due to retardation of the ignition timing.

However, at each of the deceleration and acceleration, a turbo lag occurs at the time of switch of the target air-fuel ratio in the comparative example, and it is feared that the turbo lag causes a fluctuation of torque. FIG. 3 and FIG. 4 illustrate the images of the change of the actual torque which is feared. At the time of deceleration, it is feared that when the target air amount and the target turbocharging pressure increase in a step manner, the actual air amount and the actual turbocharging pressure do not increase at a high speed so as to track the increase. This is because even if the target degree of wastegate valve opening is changed to the closing side in a step manner in the engine equipped with the turbocharger, the actual turbocharging pressure does not increase immediately due to a so-called turbo lag. As described above, in the time period in which the air amount is increased prior to switching of the target air-fuel ratio, the ignition timing is retarded to cancel out the increase of the torque due to the excessive air amount. In the comparative example shown in FIG. 3, it is feared that the retardation time of the ignition timing becomes long due to slow increase of the air amount due to a turbo lag, and exceeds a time limit (for example, 0.5 to 1.0 sec or longer) that is set based on the temperature constraint of the exhaust system such as the turbocharger and the catalyst. In this case, an increase of the torque due to an excessive air amount cannot be cancelled out by the decrease of the torque by retardation of the ignition timing, and a torque fluctuation occurs. Further, at the time of acceleration, it is feared that before and after the target first air amount and the target turbocharging pressure decrease in a step manner, the actual air amount and the actual turbocharging pressure do not track the target first air amount and the target turbocharging pressure due to a turbo lag. In the comparative example illustrated in FIG. 4, turbo lags occur respectively at times of increase of the target air amount and increase of the target turbocharging pressure before and after the target first air amount and the target turbocharging pressure decrease in a step manner. In this case, the actual air amount cannot track the target first air amount immediately, and the torque fluctuations occur.

The above described concerns in the comparative example illustrated in FIG. 3 are solved as follows according to the logic which is adopted in the present embodiment.

Figure 5:
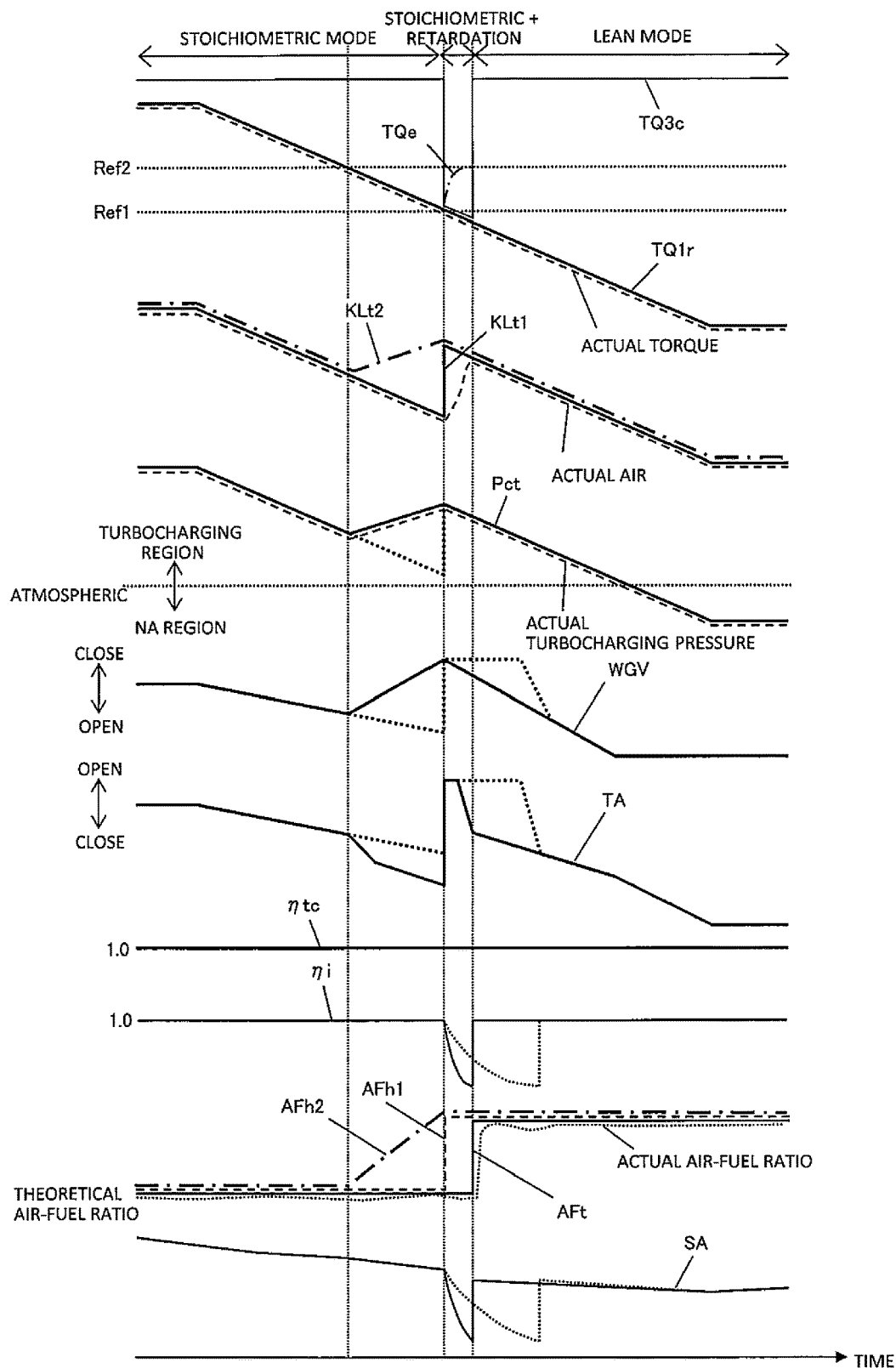
FIG. 5 is a time chart illustrating an image of a control result at a time of deceleration by the controlling device according to the embodiment of the present invention.
Figure 6:
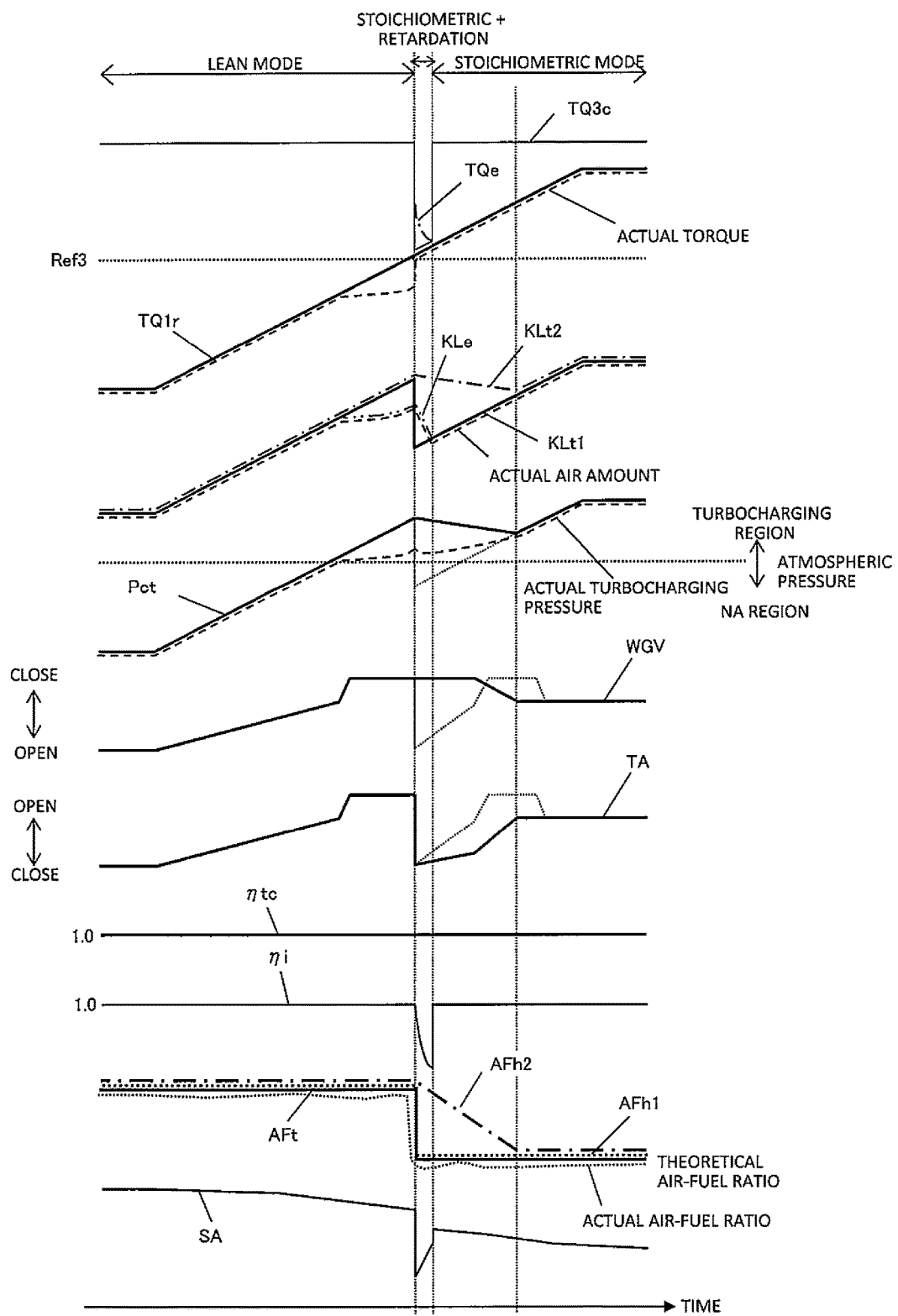
FIG. 6 is a time chart illustrating an image of a control result at a time of acceleration by the controlling device according to the embodiment of the present invention.

FIG. 5 is a time chart that illustrates an image of results of control at a time of deceleration performed by the ECU according to the present embodiment. FIG. 6 is a time chart that illustrates an image of results of control at a time of acceleration performed by the ECU according to the present embodiment. In each of FIG. 5 and FIG. 6, a chart on a first tier illustrates changes over time in the torque. As described above, "TQ1r" denotes the requested first torque, "TQ3c" denotes the target third torque for switching, and "TQe" denotes the estimated torque. Note that, in this case it is assumed that the requested first torque is the final target first torque, and the target third torque for switching is the final target third torque. Further, the requested second torque is not illustrated here, but the requested second torque has the same value as the requested first torque. Further, in addition to these torques, the actual torque is represented by a dashed line on the chart. However, the actual torque is not measured by the actual engine control. The line for the actual torque that is shown in the chart is an image line that is supported by test results.

A chart on a second tier in FIG. 5 and FIG. 6 illustrates changes over time in the air amount. As described above, "KLt1" denotes the target first air amount, "KLe" denotes the estimated air amount. In addition to these air amounts, the actual air amount is also represented by a dashed line in the chart. However, the actual air amount is not measured by the actual engine control. The line for the actual air amount that is shown in the chart is an image line that is supported by test results.

Charts on third tiers in FIG. 5 and FIG. 6 illustrate changes over time of the target turbocharging pressure. As described above, "Pct" denotes the target turbocharging pressure. In the charts, the actual turbocharging pressures are expressed by the dotted lines together with the target turbocharging pressures.

Charts on the fourth tiers in FIG. 5 and FIG. 6 illustrate changes over time of the target degree of wastegate valve opening. As described above, "WGV" denotes the target degree of wastegate valve opening.

Charts on the fifth tiers in FIG. 5 and FIG. 6 illustrate changes over time of the target degree of throttle opening. As described above, "TA" denotes a target degree of throttle opening.

A chart on a sixth tier in FIG. 5 and FIG. 6 illustrates changes over time in a target efficiency for switching. As described above, "ηtc" denotes the target efficiency for switching. Note that in this case, the target efficiency for switching is a final target efficiency.

A chart on a seventh tier in FIG. 5 and FIG. 6 illustrates changes over time in the indicated ignition timing efficiency. As described above, "ηi" denotes the indicated ignition timing efficiency.

A chart on an eighth tier in FIG. 5 and FIG. 6 illustrates changes over time in the air-fuel ratio. As described above, "AFt" denotes the target air-fuel ratio, and "AFh1" denotes the virtual first air-fuel ratio and "AFh2" denotes the virtual second air-fuel ratio. The virtual first air-fuel ratio is a parameter that gives the conversion efficiency of the air amount into torque, and the air amount which is necessary to achieve the requested first torque under the virtual first air-fuel ratio is the target first air amount. Further, the virtual second air-fuel ratio is also a parameter of the same kind as the virtual first air-fuel ratio, and the air amount necessary to achieve the second requested torque under the virtual second air-fuel ratio is the target second air amount. In the present embodiment, the target air-fuel ratio and the virtual first air-fuel ratio are both switched in a step manner between the first air-fuel ratio (the theoretical air-fuel ratio) and the second air-fuel ratio (the lean air-fuel ratio), and the virtual second air-fuel ratio is gradually switched between the first air-fuel ratio (the theoretical air-fuel ratio) and the second air-fuel ratio (the lean air-fuel ratio). Further, the charts illustrate the changes over time of the actual air-fuel ratio by the dotted lines together with these air-fuel ratios.

A chart on a ninth tier in FIG. 5 and FIG. 6 and a chart on a seventh tier in FIG. 5 illustrate changes over time in the ignition timing. As described above, "SA" denotes the ignition timing.

First, results of control at a time of deceleration will now be described based on FIG. 5. At a time of deceleration, until the requested first torque reduces to a level of the second reference value described by "Ref2", the target air-fuel ratio is maintained at the first air-fuel ratio which is the theoretical air-fuel ratio, and the virtual first air-fuel ratio and the virtual second air-fuel ratio are also maintained at the first air-fuel ratio. Hence, the target first air amount which is calculated from the requested first torque and the virtual first air-fuel ratio, and the target second air amount which is calculated from the requested second torque and the virtual second air-fuel ratio decrease in response to a decrease in the requested first torque. During this period, the target third torque for switching is set to an invalid value in response to the target air-fuel ratio and the virtual first air-fuel ratio matching. Since the indicated ignition timing efficiency becomes 1 when the target third torque for switching is an invalid value, the ignition timing is maintained at the optimal ignition timing. Note that, although the ignition timing in the chart changes in accordance with a decrease in the requested first torque, this is a change that corresponds to the optimal ignition timing changing depending on the engine speed or the air amount.

When the requested first torque becomes lower than the second reference value, the target air-fuel ratio and the virtual first air-fuel ratio are maintained at the theoretical air-fuel ratio, while the virtual second air-fuel ratio is gradually changed to the lean side. While the requested first torque decreases, the virtual second air-fuel ratio becomes lean, whereby a decrease in the target second air amount which is calculated from the requested second torque and the virtual second air-fuel ratio is restrained. Since a decrease in the target turbocharging pressure which is calculated from the target second air amount is restrained with this, the actual turbo charging pressure tracks the target turbocharging pressure, and a decrease in the actual turbocharging pressure is restrained.

The requested first torque reduces to a level of the first reference value which is described by "Ref1" in due course, and at this time, the virtual second air-fuel ratio reaches the second air-fuel ratio. Subsequently, at this point of time, the virtual first air-fuel ratio is switched from the first air-fuel ratio to the second air-fuel ratio. That is, when the requested first torque becomes lower than the first reference value, the target air-fuel ratio is maintained at the theoretical air-fuel ratio, whereas the virtual first air-fuel ratio is made leaner in a step manner. Operation according to the second air-fuel ratio that is a lean air-fuel ratio requires a larger air amount than the air amount required for operation according to the first air-fuel ratio that is the theoretical air-fuel ratio. Therefore, when the virtual first air-fuel ratio that is used for calculating the target air amount is switched in a step manner to the second air-fuel ratio, the target first air amount also increases in a step manner at the time point of such switching. According to the logic which is adopted in the present embodiment, the target turbocharging pressure corresponding to the operation by the second air-fuel ratio which is a lean air-fuel ratio at the time point of switch of the virtual first air-fuel ratio is already realized, and therefore the actual air amount and the estimated air amount which is an estimated value of the actual air amount increase at a high speed without being influenced by turbo lags as in the aforementioned comparative example. The actual air amount and the estimated air amount converge to the target air amount, and in due course, the difference between the target air amount and the estimated air amount becomes equal to or smaller than a threshold value. At this point of time, the target air-fuel ratio is switched from the first air-fuel ratio to the second air-fuel ratio.

During a period until the target air-fuel ratio and the virtual first air-fuel ratio coincide with each other again after the requested first torque becomes lower than the second reference value and the target air-fuel ratio and the virtual first air-fuel ratio deviate from each other, the target third torque for switching is set at the same value as the requested first torque which is a valid value. Meanwhile, the estimated torque predicated on the virtual first air-fuel ratio becomes a value larger than the requested first torque predicated on the first target air-fuel ratio as the virtual first air-fuel ratio that is used in calculation of the target air amount is made leaner than the target air-fuel ratio. As the result, the indicated ignition timing efficiency which is the proportion of the target third torque for switching relative to the estimated torque becomes a value smaller than one. Subsequently, in response to the indicated ignition timing efficiency becoming smaller than one, the ignition timing is retarded from the optimal ignition timing. As the result, increase in the torque by the excessive air amount is cancelled out by decrease in the torque by retardation of the ignition timing, and the deviation of the actual torque from the requested first torque is prevented.

As illustrated in the aforementioned comparative example, when the air-fuel ratio for use in calculation of the target second air amount is switched from the first air-fuel ratio to the second air-fuel ratio in a step manner simultaneously with switch of the virtual first air-fuel ratio which is used in the target first air amount, the target first air amount increases in a step manner, and at the same time, the target second air amount also increases in a step manner. In this case, the actual air amount does not increase at a high speed due to the influence of a turbo lag, and therefore the retardation time period of the ignition timing is likely to exceed a limit. However, according to the logic which is adopted in the present embodiment, at the time point of switch of the virtual first air-fuel ratio for use in the target first air amount, the target second air amount corresponding to the second air-fuel ratio which is a lean air-fuel ratio is realized. Hence, the actual air amount tracks the target first air amount at a high speed without being influenced by the turbo lag as in the aforementioned comparative example, and therefore the situation where the retardation time period of the ignition timing exceeds the limit and a torque fluctuation occurs can be effectively restrained.

As above, according to the logic which is adopted in the present embodiment, the air-fuel ratio can be switched from the first air-fuel ratio which is the theoretical air-fuel ratio to the second air-fuel ratio which is the air-fuel ratio leaner than the theoretical air-fuel ratio with a high responsiveness while smooth decrease of torque corresponding to the deceleration request of the driver is achieved.

Subsequently, a control result at a time of acceleration will be described based on FIG. 6. At a time of acceleration, until the requested first torque increases to a level of the third reference value, the target air-fuel ratio is maintained at the second air-fuel ratio which is a lean air-fuel ratio, and the virtual first air-fuel ratio and the virtual second air-fuel ratio are also maintained at the second air-fuel ratio. Hence, the target first air amount which is calculated from the requested first torque and the virtual first air-fuel ratio and the target second air amount which is calculated from the second requested torque and the virtual second air-fuel ratio increase in response to an increase of the requested first torque. However, when the target turbocharging pressure enters a turbocharging region with the increase in the target first air amount, the actual air amount and the estimated air amount decrease later than the target first air amount due to influence of turbo lags. The target third torque for switching in this time period is made an invalid value in response to the target first air amount and the estimated air amount corresponding to each other. Since the indicated ignition timing efficiency becomes 1 when the target third torque for switching has an invalid value, the ignition timing is maintained at the optimal ignition timing.

When the requested first torque exceeds the third reference value, the virtual first air-fuel ratio is switched from the second air-fuel ratio to the first air-fuel ratio which is the theoretical air-fuel ratio, and simultaneously with this, the target air-fuel ratio is also switched from the second air-fuel ratio to the first air-fuel ratio. The operation by the first air-fuel ratio which is the theoretical air-fuel ratio requires a smaller air amount as compared with the operation by the second air-fuel ratio which is the lean air-fuel ratio. Hence, the virtual first air-fuel ratio for use in calculation of the target first air amount is switched to the first air-fuel ratio in a step manner, whereby at the time point of the switching, the target first air amount also decreases in a step manner. However, the actual air amount and the estimated air amount do not decrease in a step manner, but decrease later than the target first air amount and converge to the target air amount in due course.

Further, when the requested first torque exceeds the third reference value, the target air-fuel ratio and the virtual first air-fuel ratio are switched to the first air-fuel ratio in a step manner, whereas the virtual second air-fuel ratio is gradually changed to a rich side. While the requested first torque increases, the virtual second air-fuel ratio gradually becomes richer, whereby the decrease in the target second air amount which is calculated from the requested second torque and the virtual second air-fuel ratio is restrained more than the decrease in the target first air amount. Since the decrease in the target turbocharging pressure which is calculated from the target second air amount is restrained with this, the decrease in the actual turbo charging pressure that tracks the target turbocharging pressure is also restrained, and is maintained in the turbocharging region.

In a time period until the target first air amount and the estimated air amount correspond to each other after the requested first torque exceeds the reference value, the target third torque for switching is set at the same value as the requested first torque which is a valid value. The estimated torque which is calculated from the estimated air amount has a value larger than the requested first torque because the estimated air amount is excessively larger than the target air amount. As a result, the indicated ignition timing efficiency which is the ratio of the target third torque for switching to the estimated torque becomes a value smaller than 1. Subsequently, the ignition timing is retarded from the optimal ignition timing in response to the indicated ignition timing efficiency being smaller than 1. As a result, the increase in torque due to the excessive air amount is cancelled out by the decrease in torque due to retardation of the ignition timing, and a deviation of the actual torque from the requested first torque is prevented.

After the target first air amount and the estimated air amount correspond to each other, the target first air amount which is calculated from the requested first torque and the virtual first air-fuel ratio and the target second air amount which is calculated from the requested second torque and the virtual second air-fuel ratio increase in response to the increase in the requested first torque again. The target third torque for switching in this period is made an invalid value in response to the target first air amount and the estimated air amount corresponding to each other. Since the indicated ignition timing efficiency becomes 1 if the target third torque for switching has an invalid value, the ignition timing is maintained at an optimal ignition timing. Since in the aforementioned comparative example, the actual turbocharging pressure is temporarily reduced to a natural aspiration region, the actual air amount in this period and the estimated air amount which is an estimated value of the actual air amount are increased later than the target air amount due to the influence of turbo lags. However, according to the logic which is adopted in the present embodiment, the actual turbocharging pressure is maintained in the turbo charging region, at the time point at which the change of the target first air amount changes to an increasing direction. Hence, the actual air amount tracks the target first air amount at a high speed without being influenced by turbo lags as in the aforementioned comparative example, and therefore, the situation where a torque fluctuation occurs can be effectively restrained.

Figure 7:
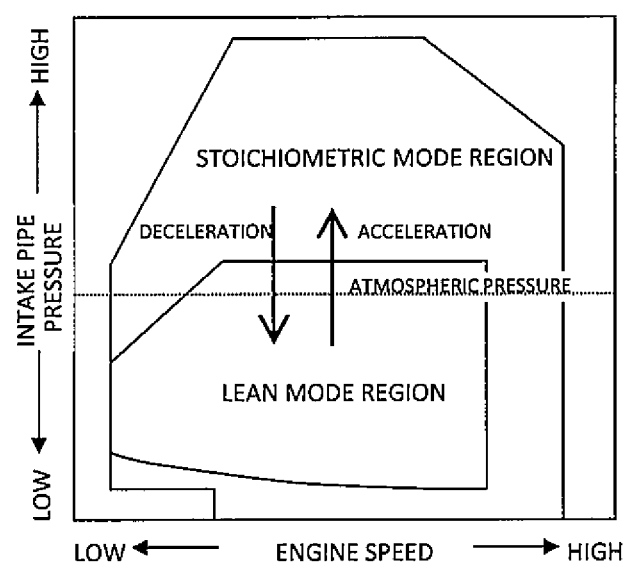
FIG. 7 is a diagram illustrating settings of operation ranges that are adopted in the controlling device according to the embodiment of the present invention.

As above, according to the logic which is adopted in the present embodiment, the torque fluctuation at least after switching of the air-fuel ratio can be eliminated, out of the torque fluctuations before and after the air-fuel ratio is switched from the second air-fuel ratio which is the air-fuel ratio leaner than the theoretical air-fuel ratio to the first air-fuel ratio which is the theoretical air-fuel ratio. Note that FIG. 7 illustrates settings of the operating ranges in the present embodiment. The operating ranges are defined by the intake pipe pressure and the engine speed. According to FIG. 8, a lean mode region in which the lean mode is selected is set in a low-to-medium speed and low-to-medium load region. From FIG. 8, it is found out that at the time of acceleration, the operation mode is switched from the stoichiometric mode to the lean mode, and at the time of deceleration, the operation mode is switched from the lean mode to the stoichiometric mode. Further, from FIG. 8, it is also found out that a region in which the lean mode is selected also exists in a turbocharging region in which the intake pipe pressure becomes higher than the atmospheric pressure. The settings of the operating ranges as shown in FIG. 8 are mapped and stored in the ECU. The ECU executes switching of the operation mode in accordance with the map.

[Others]

The present invention is not limited to the aforementioned embodiments, and can be carried out by being modified variously within the range without departing from the gist of the present invention. For example, modifications as follows may be adopted.

The air-fuel ratio (virtual air-fuel ratio) that is used for calculating a target air amount in the first embodiment can be replaced with an equivalence ratio. The equivalence ratio is also a parameter that provides a conversion efficiency of the air amount to torque, and corresponds to a parameter that corresponds to the air-fuel ratio. Likewise, an excess air factor can be used as a parameter that provides a conversion efficiency of the air amount to torque.

As the parameter for use in the calculation of the target air amount, a parameter corresponding to the ignition timing can be also used. As the ignition timing is retarded more from the optimal ignition timing, the torque which is generated with the same air amount becomes lower, and therefore, the parameter corresponding to the ignition timing corresponds to a parameter which provides a conversion efficiency of the air amount to torque. For example, a torque-air amount conversion map which is used in the calculation of the target air amount is prepared at each ignition timing, and the value of the ignition timing that is used in search of the map can be changed in response to switching of the operation mode. More specifically, at the time of deceleration when the requested first torque decreases, the ignition timing which is used to search the map is set as the optimal ignition timing in a period in which the requested first torque is larger than the reference value, and the ignition timing which is used to search the map is retarded from the optimal ignition timing in response to decrease of the requested torque to the reference value or smaller. In this case, the air-fuel ratio which is used to search the map is the target air-fuel ratio.

A variable lift amount mechanism that makes a lift amount of the intake valve variable can also be used as a intake property variable actuator that changes the amount of air drawn into the cylinders. The variable lift amount mechanism can be used in combination with another first actuator such as the throttle or VVT.

A variable nozzle can also be used as a turbocharging property variable actuator that changes a supercharging property of the turbocharger. Further, if the turbocharger is assisted by an electric motor, the electric motor can also be used as a third actuator.

In the embodiment of the present invention, an injector as the second actuator is not limited to a port injector. An in-cylinder injector that injects fuel directly into the combustion chamber can also be used, and both a port injector and an in-cylinder injector may also be used in combination.

The first air-fuel ratio is not limited to the theoretical air-fuel ratio. The first air-fuel ratio can also be set to an air-fuel ratio that is leaner than the theoretical air-fuel ratio, and an air-fuel ratio that is leaner than the first air-fuel ratio can be set as the second air-fuel ratio.

REFERENCE SIGNS LIST

2 Throttle
4 Injector
6 Ignition device
8 Variable valve timing mechanism
10 Wastegate valve
100 Engine controller
101, 105 Interface as requested torque receiving means
200 Powertrain manager
182 Arithmetic unit as target air amount calculation means
190 Arithmetic unit as target first air amount calculation means
192 Arithmetic unit as target second air amount calculation means
194, 166, 178 Arithmetic unit as intake property variable actuator control means
196, 186 Arithmetic unit as turbo charging property variable actuator control means
174, 176 Arithmetic unit as second actuator control means
168, 170, 172 Arithmetic unit as third actuator control means
404 Arithmetic unit as first parameter value changing means
410 Arithmetic unit as second parameter value changing means
406 Arithmetic unit as target air-fuel ratio switching means

The invention claimed is:

1. A controlling device for an internal combustion engine equipped with a turbocharger, that has a first actuator that changes an amount of air that is taken into a cylinder, a second actuator that supplies fuel into the cylinder, and a third actuator that ignites a mixture gas in the cylinder, and is configured to be capable of selecting an operation by a first air-fuel ratio and an operation by a second air-fuel ratio that is leaner than the first air-fuel ratio, comprising:

requested torque reception means for receiving a requested torque;

target air amount calculation means for calculating a target air amount for achieving the requested torque from the requested torque by using a parameter that gives a conversion efficiency of an air amount into torque;

parameter value changing means for changing a value of the parameter to a value that reduces the conversion efficiency in response to a decrease of the requested torque to a reference value or smaller;

target air-fuel ratio switching means for switching a target air-fuel ratio from the first air-fuel ratio to the second air-fuel ratio, after the value of the parameter is changed to the value that reduces the conversion efficiency;

first actuator control means for determining an operation amount of the first actuator based on the target air amount, and operating the first actuator in accordance with the operation amount;

second actuator control means for determining a fuel supply amount based on the target air-fuel ratio, and operating the second actuator in accordance with the fuel supply amount; and third actuator control means for determining an ignition timing for achieving the requested torque based on a torque that is estimated from the operation amount of the first actuator and the target air-fuel ratio, and the requested torque, and operating the third actuator in accordance with the ignition timing, wherein the target air amount calculation means includes
target first air amount calculation means for calculating the target first air amount for achieving the requested torque from the requested torque by using a first parameter that gives a conversion efficiency of an air amount into torque, and
target second air amount calculation means for calculating a target second air amount for achieving the requested torque from the requested torque by using a second parameter that gives a conversion efficiency of the air amount into torque, the parameter value changing means includes
first parameter value changing means for changing a value of the first parameter to a value that reduces the conversion efficiency in response to the requested torque being reduced to a first reference value or smaller, and
second parameter value changing means for
starting to change a value of the second parameter in a direction to reduce the conversion efficiency in response to the requested torque being decreased to a second reference value or lower, the second reference value larger than the first reference value, and
gradually changing the value of the second parameter in the direction to reduce the conversion efficiency in accordance with the requested torque further decreasing from the second reference value to the first reference value,
the target air-fuel ratio switching means includes means for switching the target air-fuel ratio from the first air-fuel ratio to the second air-fuel ratio, after the value of the first parameter is changed to a value that reduces the conversion efficiency,
the first actuator includes
an intake property variable actuator that changes an intake property of air that is taken into the cylinder in an intake passage at a downstream side of the turbocharger, and
a turbocharging property variable actuator that changes a turbocharging property of the turbocharger, and
the first actuator control means includes
intake property variable actuator control means for determining an operation amount of the intake property variable actuator based on the target first air amount, and operating the intake property variable actuator in accordance with the operation amount, and
turbocharging property variable actuator control means for determining an operation amount of the turbocharging property variable actuator based on a target turbocharging pressure that is calculated from the target second air amount, and operating the turbocharging property variable actuator in accordance with the operation amount.

2. The controlling device for an internal combustion engine equipped with a turbocharger according to claim 1, wherein
the parameter is a parameter corresponding to an air-fuel ratio,
the first parameter value changing means includes means for switching the value of the first parameter from a value corresponding to the first air-fuel ratio to a value corresponding to the second air-fuel ratio in response to a decrease of the requested torque to the first reference value or lower, and
the second parameter value changing means includes means for setting the value of the second parameter at the value corresponding to the first air-fuel ratio in response to the requested torque being larger than the second reference value, starting to change the value of the second parameter from the value corresponding to the first air-fuel ratio in response to a decrease of the requested torque to the second reference value or smaller, and gradually changing the value of the second parameter from the value corresponding to the first air-fuel ratio to the value corresponding to the second air-fuel ratio in accordance with the requested torque decreasing from the second reference value to the first reference value.

3. The controlling device for an internal combustion engine equipped with a turbocharger according to claim 1, wherein
the target air-fuel ratio switching means switches the target air-fuel ratio from the first air-fuel ratio to the second air-fuel ratio, after a difference between the target first air amount and an air amount that is estimated from the operation amount of the first actuator becomes equal to or smaller than a threshold value, after the first parameter value is changed to the value that reduces the conversion efficiency.

4. The controlling device for an internal combustion engine equipped with a turbocharger according to claim 1, wherein
the target air-fuel ratio switching means switches the target air-fuel ratio from the first air-fuel ratio to the second air-fuel ratio, after a fixed time period elapses, after the first parameter value is changed to the value that reduces the conversion efficiency.

5. The controlling device for an internal combustion engine equipped with a turbocharger according to claim 1, wherein
the first parameter value changing means includes means for changing the value of the first parameter to a value that increases the conversion efficiency in response to an increase of the requested torque to a third reference value or higher,
the target air-fuel ratio switching means includes means for switching the target air-fuel ratio from the second air-fuel ratio to the first air-fuel ratio in response to a change of the value of the first parameter to the value that increases the conversion efficiency, and
the second parameter value changing means starts to change the value of the second parameter to a direction to increase the conversion efficiency in response to the increase of the requested torque to the third reference value or higher, and gradually changes the value of the second parameter to the direction to increase the conversion efficiency in accordance with the requested torque further increasing from the third reference value.

6. The controlling device for an internal combustion engine equipped with a turbocharger according to claim 5, wherein
the parameter is a parameter corresponding to the air-fuel ratio,
the first parameter value changing means includes means for switching the value of the first parameter from the value corresponding to the second air-fuel ratio to the value corresponding to the first air-fuel ratio in response to the increase of the requested torque to the third reference value or higher, and
the second parameter value changing means includes means for setting the value of the second parameter at the value corresponding to the second air-fuel ratio in response to the requested torque being smaller than the third reference value, starting to change the value of the second parameter from the value corresponding to the second air-fuel ratio in response to the increase of the requested torque to the third reference value or higher, and gradually changing the value of the second parameter from the value corresponding to the second air-fuel ratio to the value corresponding to the first air-fuel ratio in accordance with the requested torque further increasing from the third reference value.

7. The controlling device for an internal combustion engine equipped with a turbocharger according to claim 1, wherein
the requested torque reception means includes
means for receiving a requested first torque, and
means for receiving a requested second torque obtained by eliminating a pulse component to a torque reduction direction from the requested first torque,
the target first air amount calculating means includes means for calculating the target first air amount for achieving the requested first torque backwards from the requested first torque by using the first parameter, and
the target second air amount calculating means includes means for calculating the target second air amount for achieving the requested second torque backwards from the requested second torque by using the second parameter.

8. A controlling device for an internal combustion engine equipped with a turbocharger, that has a first actuator that changes an amount of air that is taken into a cylinder, a second actuator that supplies fuel into the cylinder, and a third actuator that ignites a mixture gas in the cylinder, and is configured to be capable of selecting an operation by a first air-fuel ratio and an operation by a second air-fuel ratio that is leaner than the first air-fuel ratio, comprising an electronic controller configured to:
receive a requested torque,
calculate a target air amount for achieving the requested torque from the requested torque by using a parameter that gives a conversion efficiency of an air amount into torque,
change a value of the parameter to a value that reduces the conversion efficiency in response to a decrease of the requested torque to a reference value or smaller,
switch a target air-fuel ratio from the first air-fuel ratio to the second air-fuel ratio, after the value of the parameter is changed to the value that reduces the conversion efficiency,
determine an operation amount of the first actuator based on the target air amount, and operate the first actuator in accordance with the operation amount,
determine a fuel supply amount based on the target air-fuel ratio, and operate the second actuator in accordance with the fuel supply amount, and
determine an ignition timing for achieving the requested torque based on a torque that is estimated from the operation amount of the first actuator and the target air-fuel ratio, and the requested torque, and operate the third actuator in accordance with the ignition timing, wherein
to calculate the target air amount, the electronic controller is configured to
calculate the target air amount for achieving the requested torque from the requested torque by using a first parameter that gives a conversion efficiency of an air amount into torque, and
calculate a target second air amount for achieving the requested torque from the requested torque by using a second parameter that gives a conversion efficiency of the air amount into torque,
to change the value of the parameter, the electronic controller is configured to
change a value of the first parameter to a value that reduces the conversion efficiency in response to the requested torque being reduced to a first reference value or smaller,
start to change a value of the second parameter in a direction to reduce the conversion efficiency in response to the requested torque being decreased to a second reference value or lower, the second reference value larger than the first reference value, and
gradually change the value of the second parameter in the direction to reduce the conversion efficiency in accordance with the requested torque further decreasing from the second reference value to the first reference value,
to switch the target air-fuel ratio, the electronic controller is configured to switch the target air-fuel ratio from the first air-fuel ratio to the second air-fuel ratio, after the value of the first parameter is changed to a value that reduces the conversion efficiency,
the first actuator includes
an intake property variable actuator that changes an intake property of air that is taken into the cylinder in an intake passage at a downstream side of the turbocharger, and
a turbocharging property variable actuator that changes a turbocharging property of the turbocharger, and
the electronic controller is configured to
determine an operation amount of the intake property variable actuator based on the target first air amount, and operate the intake property variable actuator in accordance with the operation amount, and
determine an operation amount of the turbocharging property variable actuator based on a target turbocharging pressure that is calculated from the target second air amount, and operate the turbocharging property variable actuator in accordance with the operation amount.

* * * * *